United States Patent
Fujiune et al.

(10) Patent No.: US 6,498,772 B1
(45) Date of Patent: Dec. 24, 2002

(54) OPTICAL DISC APPARATUS

(75) Inventors: Kenji Fujiune, Neyagawa (JP);
Takashi Kishimoto, Ikoma (JP);
Takeharu Yamamoto, Takatsuki (JP);
Katsuya Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 213 days.

(21) Appl. No.: 09/665,278

(22) Filed: Sep. 19, 2000

(30) Foreign Application Priority Data

Sep. 20, 1999 (JP) .......................................... 11-265577

(51) Int. Cl.[7] .............................................. G11B 7/00
(52) U.S. Cl. .............................. 369/44.29; 369/44.35; 369/44.32; 369/53.14
(58) Field of Search ........................... 369/44.28, 44.32, 369/44.29, 53.14, 53.35, 47.44, 53.18, 44.26; 360/77.04

(56) References Cited

U.S. PATENT DOCUMENTS

| | | | | |
|---|---|---|---|---|
| 4,745,587 A | * | 5/1988 | Maeda et al. | 369/44.28 |
| 4,866,687 A | * | 9/1989 | Kasai et al. | 369/43 |
| 4,985,882 A | * | 1/1991 | Tanaka et al. | 360/77.04 |
| 5,517,474 A | * | 5/1996 | Takamine | 369/44.32 |
| 5,615,191 A | * | 3/1997 | Takeda et al. | 360/77.04 |
| 5,745,455 A | * | 4/1998 | Takeda et al. | 360/77.04 |
| 5,907,448 A | * | 5/1999 | Watanabe et al. | 360/77.04 |
| 6,181,652 B1 | * | 1/2001 | Katou et al. | 369/53.14 |
| 6,370,094 B1 | * | 4/2002 | Kishinami et al. | 369/53.14 |

FOREIGN PATENT DOCUMENTS

| | | | |
|---|---|---|---|
| EP | 0862169 A1 | * | 9/1998 |
| JP | 52-80802 | | 7/1977 |
| JP | 01300437 A | * | 12/1989 |
| JP | 7-69743 | | 7/1995 |
| JP | 2714218 | | 10/1997 |

\* cited by examiner

Primary Examiner—Thang V. Tran
(74) Attorney, Agent, or Firm—RatnerPrestia

(57) ABSTRACT

An optical apparatus includes a generator for generating a sine wave based on a rotating disc-shaped information carrier, and an eccentricity measuring device for measuring gain and phase of a sine wave corresponding to eccentricity of the information carrier based on the driving signal from the tracking control and on the measured rotation frequency. Also included is a waveform shaper for shaping the gain and phase of the sine wave generated by the sine wave generator using the measured gain and phase obtained by the eccentricity measuring device. An eccentricity correction is applied by adding together the sine wave shaped by the waveform shaper and the driving signal from the tracking control to drive an optical beam on a desired track of the rotating disc.

14 Claims, 18 Drawing Sheets

OPTICAL DISC APPARATUS

BACKGROUND OF THE INVENTION

1. Field of the Invention

The present invention relates to an optical disc apparatus having a tracking control function for causing an optical beam to accurately follow an eccentricity of a track of a rotating disc-shaped information carrier (hereafter referred to as an "optical disc") having tracks each comprising a pit or a guide groove.

2. Related art of the Invention

To reproduce a signal, a conventional optical disc apparatus irradiates an optical disc with relatively faint optical beams of a fixed light quantity to detect reflected light modulated for intensity by the optical disc. To record a signal, the device modulates the light quantity of optical beams depending on a recorded signal to write information to a recording material film on the optical disc (for example, Japanese Patent Laid-Open No. 52-80802).

A reproduction-only optical disc has pit-based information spirally recorded therein. A recordable and reproducible optical disc is produced by using evaporation or the like to form an optically recordable and reproducible material film on a base material surface having spiral tracks of a relief structure. Recording information on the optical disc or reproducing the recorded information requires focus control for controlling optical beams in a perpendicular direction (hereafter referred to as a "focus direction") of the optical disc surface in such a manner that the optical beams are always in a predetermined converging state on the recording material film, and tracking control for controlling the optical beams in a radial direction (hereafter referred to as a "tracking direction") so that the beams are always located on a predetermined track.

A retrieval operation by the conventional optical disc will be described with reference to FIG. 16. An optical head 10 has a semiconductor laser 11, a coupling lens 12, a polarizing beam splitter 13, a quarter wavelength plate 14, a focus actuator 16, a tracking actuator 17, a detection lens 18, a cylindrical lens 19, and a photodetector 20 mounted therein. Optical beams generated by the semiconductor laser 11 are made parallel beams by the coupling lens 12, so that the parallel beams pass through the polarizing beam splitter 13 and the quarter wavelength plate 14 and are converged on a disc-shaped optical disc 1 by a converging lens 15.

The thus reflected beams pass through the converging lens 15 and the quarter wavelength plate 14, are subsequently reflected by the polarizing beam splitter 13, and then pass through the detection lens 18 and the cylindrical lens 19 onto the photodetector 20, which is divided into four. The converging lens 15 is supported by an elastomer and is electromagnetically moved in the focus direction when current flow through the focus actuator 16 or in the tracking direction when current flows through the tracking actuator 17. The photodetector 20 transmits a detected light quantity signal to a focus error generator 30 (hereafter referred to as an "FE generator 30") or a tracking error generator 40 (hereafter referred to as a "TE generator 40").

The FE generator 30 uses the light quantity signal from the photodetector 20 to calculate an error signal (hereafter referred to as an "FE signal") indicating how the optical beams are converging on an information surface of the optical disc 1 and transmits the signal to the focus actuator 16 via a focusing filter 31 (hereafter referred to as an "Fc filter 31"). The focus actuator 16 controls the converging lens 15 in the focus direction so that the optical beams converge on a recording surface of the optical disc 1 in a predetermined state. This is the focus control.

The TE generator 40 uses the light quantity signal from the photodetector 20 to calculate an error signal (hereafter referred to as a "TE signal") indicating the positional relationship between the optical beams and tracks on the optical disc 1 and then transmits the signal to the tracking actuator 17 via a tracking filter 41 (hereafter referred to as a "Tk filter 41") and an adder 42. The tracking actuator 17 controls the converging lens 15 in the tracking direction in such a manner that the optical beams follow the tracks. This is the tracking control.

A driving signal from the Tk filter 41 is transmitted to an memory 60. A motor 50 rotates the optical disc 1 to transmit 1,000 encoder pulses per one rotation to a rotation phase detect device 51. The rotation phase detect device 51 counts rising edges in the encoder pulses from the motor 50, and clears the count value to zero when 1,000 pulses corresponding to one rotation are counted, thereby to transmit the resulting rotation phase information to the memory 60. An eccentricity compensation controling signal 62 transmits a control signal to the memory 60.

If the control signal from the eccentricity compensation controling signal 62 is at a high level, the memory 60 stores a signal from the Tk filter 41 at an address corresponding to rotation phase information from the rotation phase detect device 51, and continues transmitting zero to a lowpass filter 61. If the control signal from the eccentricity compensation controling signal 62 is at a low level, the memory 60 transmits a value stored at an address that is based on the rotation phase information from the rotation phase detect device 51, to the adder 42 via the lowpass filter 61. The adder 42 adds a signal from the Tk filter 41 and a signal from the lowpass filter 61 together and then transmits the resulting signal to the tracking actuator 17.

The operation will be explained with reference to FIG. 17. FIG. 17a shows rotation phase information from the rotation phase detect device 51, FIG. 17b shows a control signal from the eccentricity compensation controling signal 62, and FIG. 17c shows a signal from the lowpass filter 61. In FIG. 17, before t0, eccentricity correction is not working, between t0 and t1, eccentricity correction learning is being executed, and after t1, the eccentricity correction is working. Between t0 and t1, the memory 60 stores the signal from the Tk filter 41 at the address that is based on the rotation phase information as shown in FIG. 17a.

At the time t1, the memory 60 completes storing eccentricity correction driving for one rotation of the optical disc. After t1, the memory 60 outputs the stored eccentricity correction driving and passes it through the lowpass filter 61 to obtain a driving waveform such as that shown in FIG. 17c. Since a driving waveform for causing to following the eccentricity shown in FIG. 17c is applied in addition to the perpendicular tracking control, the tracking actuator 17 accurately follows the eccentricity of the tracks.

Not only the signal from the Tk filter 41 in the tracking control state but also the TE generator 40 in a tracking non-control state may be used for measurements for generating the eccentricity correction driving (Japanese Patent Laid Open No. 3-272030).

Eccentricity is caused by the deviation of a rotation center or track waves; it is mostly caused by the deviation of the rotation center. The components of the rotation center deviation comprises only the rotation frequency components of the optical disc.

With the tracking control, eccentricity correction corrects a main component of the rotation center deviation to enable the optical beams to accurately follow the tracks. When a signal waveform is to be recorded in the memory 60, the result of the recording is affected by noise or the like. As shown in the left figure in FIG. 18a, the waveform generally includes components other than the rotation frequency components of the optical disc, so that the result of the recording in the memory 60 has an error with respect to a target sine wave as shown in the right figure in FIG. 18a. To eliminate such an error, there has been a method for recording waveforms for two or more rotations for averaging in the memory 60. However, this method disadvantageously requires a large amount of time for measurements.

Alternatively, mostly without the tracking control, a deviation in the tracking direction caused by the eccentricity correction driving has a predetermined gain and a predetermined phase delay due to a transfer characteristic of the tracking actuator 17. Accordingly, the deviation in the tracking direction of the converging lens 15 caused by the driving for correcting the eccentricity has an error with respect to eccentricity. To suppress the correction error, there has been a method for modifying the eccentricity correction driving by measuring the deviation of the lens 15 from the eccentricity correction driving in the tracking direction using a sensor for sensing the absolute position of the lens 15 in the tracking direction (Japanese Patent Laid Open No. 2-141809). Due to the use of sensors, however, this measure disadvantageously requires a large number of parts and high costs.

Additionally, the rotation phase information from the rotation phase detect device 51 is generated using a rotation start time as a reference. If no access has occurred for a long time in order to reduce power consumption and once the optical disc apparatus has entered a sleep state, the power to the motor 50 and the rotation phase detect device 51 also remains off during this period to change the reference for the rotation phase information output from the rotation phase detect device 51. Disadvantageously, once the reference for the rotation phase information from the rotation phase detect device 51 has changed after the sleep state, the eccentricity correction driving adjusted before the sleep state can no longer be used and must be readjusted due to a change in phase. There is such problem.

SUMMARY OF THE INVENTION

To solve the above problems, the present invention comprises a TE signal detecting means of detecting a positional error between an optical beam and a track of an optical disc, a tracking control means of controlling the optical beam so as to follow the track based on a TE signal from the TE signal detecting means, a rotation number measuring means of measuring a rotation number of the optical disc, an eccentricity measuring means of measuring the magnitude and direction of eccentricity relative to a rotation phase of the optical disc based on a signal from the TE signal detecting means and the measured rotation number from the rotation number measuring means, and an eccentricity correcting means of generating tracking driving based on the magnitude and direction of the eccentricity from the eccentricity measuring means.

Additionally, the present invention comprises aTE signal detecting means of detecting a positional error between an optical beam and a track of an optical disc, a tracking control means of controlling the optical beam so as to follow the track based on a TE signal from the TE signal detecting means, a rotation number measuring means of measuring a rotation number of the optical disc, an eccentricity measuring means of measuring the magnitude and direction of eccentricity relative to a rotation phase of the optical disc based on a driving signal from the tracking control means and the measured rotation number from the rotation number measuring means, and an eccentricity correcting means of generating tracking driving based on the magnitude and direction of the eccentricity from the eccentricity measuring means.

Further, the present invention comprises a TE signal detecting means of detecting a positional error between an optical beam and a track of an optical disc, a tracking control means of controlling the optical beam so as to follow the track based on a TE signal from the TE signal detecting means, an address detecting means of detecting the address of an information carrier irradiated with the optical beam, and a rotation phase measuring means of determining a reference for a rotation phase from the detected address to measure the rotation phase of the optical disc.

Furthermore, the present invention comprises a TE signal detecting means of detecting a positional error between an optical beam and a track of an optical disc, a tracking control means of controlling the optical beam so as to follow the track based on a TE signal from the TE signal detecting means, a switching point detecting means of detecting a switching point from a recess to a projection of a track groove of the optical disc or from the projection to the recess thereof, and a rotation phase measuring means of determining a reference for a rotation phase from the detected switching point position to measure the rotation phase of the optical disc.

Moreover, the present invention comprises a TE signal detecting means of detecting a positional error between an optical beam and a track of an optical disc, a tracking control means of controlling the optical beam so as to follow the track based on a TE signal from the TE signal detecting means, a disturbance detecting means of measuring a disturbance in rotation phase information on the optical disc, and a rotation phase measuring means of determining a reference for a rotation phase from the detected disturbance of the rotation phase to measure the rotation phase of the optical disc.

DESCRIPTION OF SYMBOLS

Figure 1:
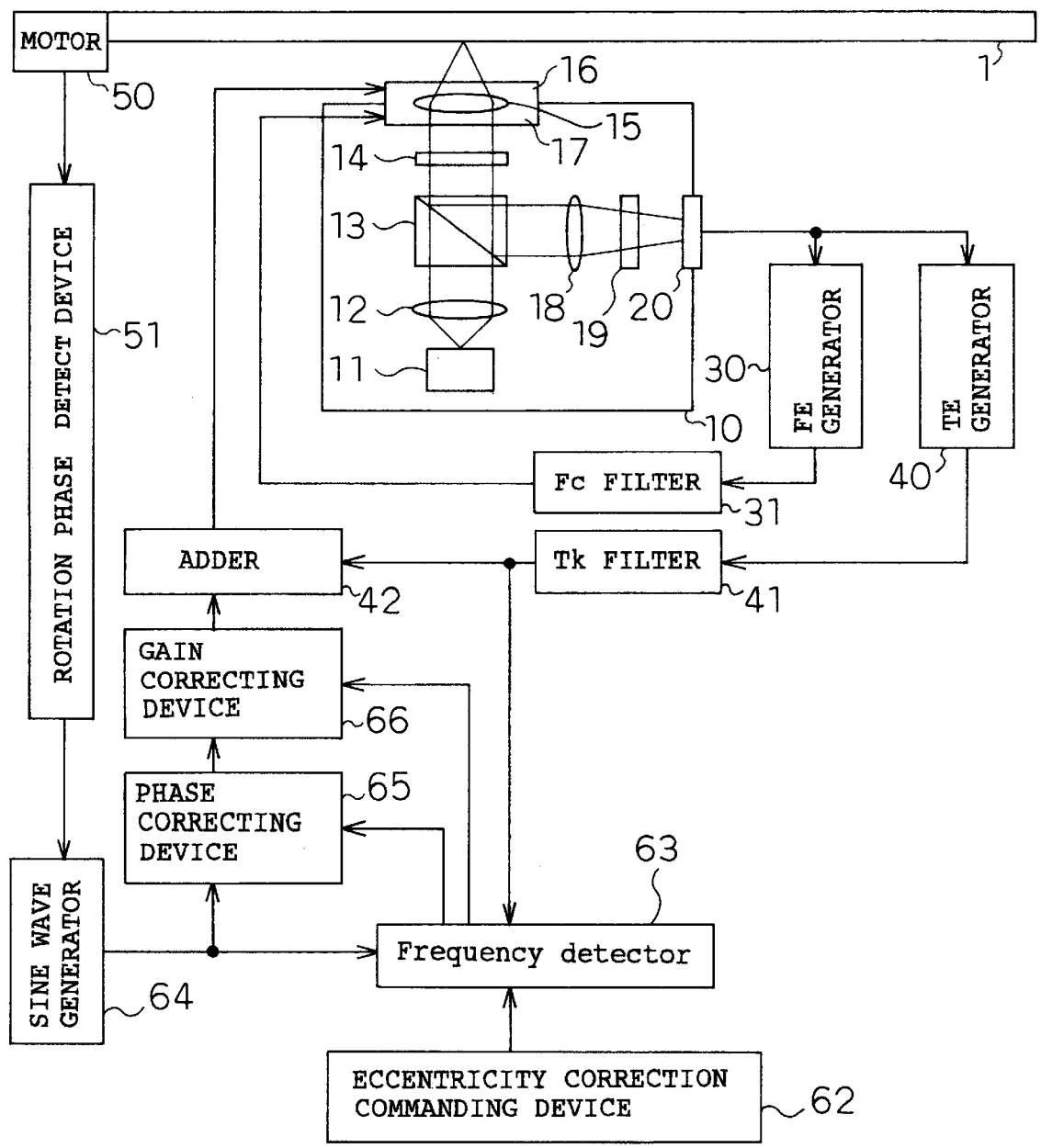
FIG. 1 is a block diagram showing the configuration of Embodiment 1.

1 Optical disc
10 Optical head
11 Laser
12 Coupling lens
13 Polarizing beam splitter
14 Quarter wavelength plate
15 Converging lens
16 Focus actuator
17 Tracking actuator
18 Detection lens
19 Cylindrical lens
20 Photodetector
30 FE generator
31 Fc filter
40 TE generator
41 Tk filter
42 Adder
43 Track cross generator
50 Motor
51 Rotation phase output device
60 Eccentricity memory
61 Lowpass filter
62 Eccentricity correction commanding device
63 Frequency detector
64 Sine wave generator
65 Phase compensating devicer
66 Gain compensating devicer
67 Multiplier
68 Adder
69 Frequency detector
70 Characteristic generator
71 Track position detector
72 Eccentricity correction commanding device
73 Vector calculator
80 Phase delaying device
81 Multiplier
82 Multiplier
83 Integrator
84 Integrator
85 Coordinate converter
90 Vector subtractor
91 Gain calculator
92 Phase calculator
100 Address detector
101 Reference address holder
102 Address comparator
103 LG polarity detector
104 LG polarity holder
105 LG polarity comparator
106 Differential maximum detector
107 Rotation reference specifying device

PREFERRED EMBODIMENTS OF THE INVENTION

Embodiments of the present invention will be described below with reference to FIGS. 1 to 15.

(Embodiment 1)

Figure 16:
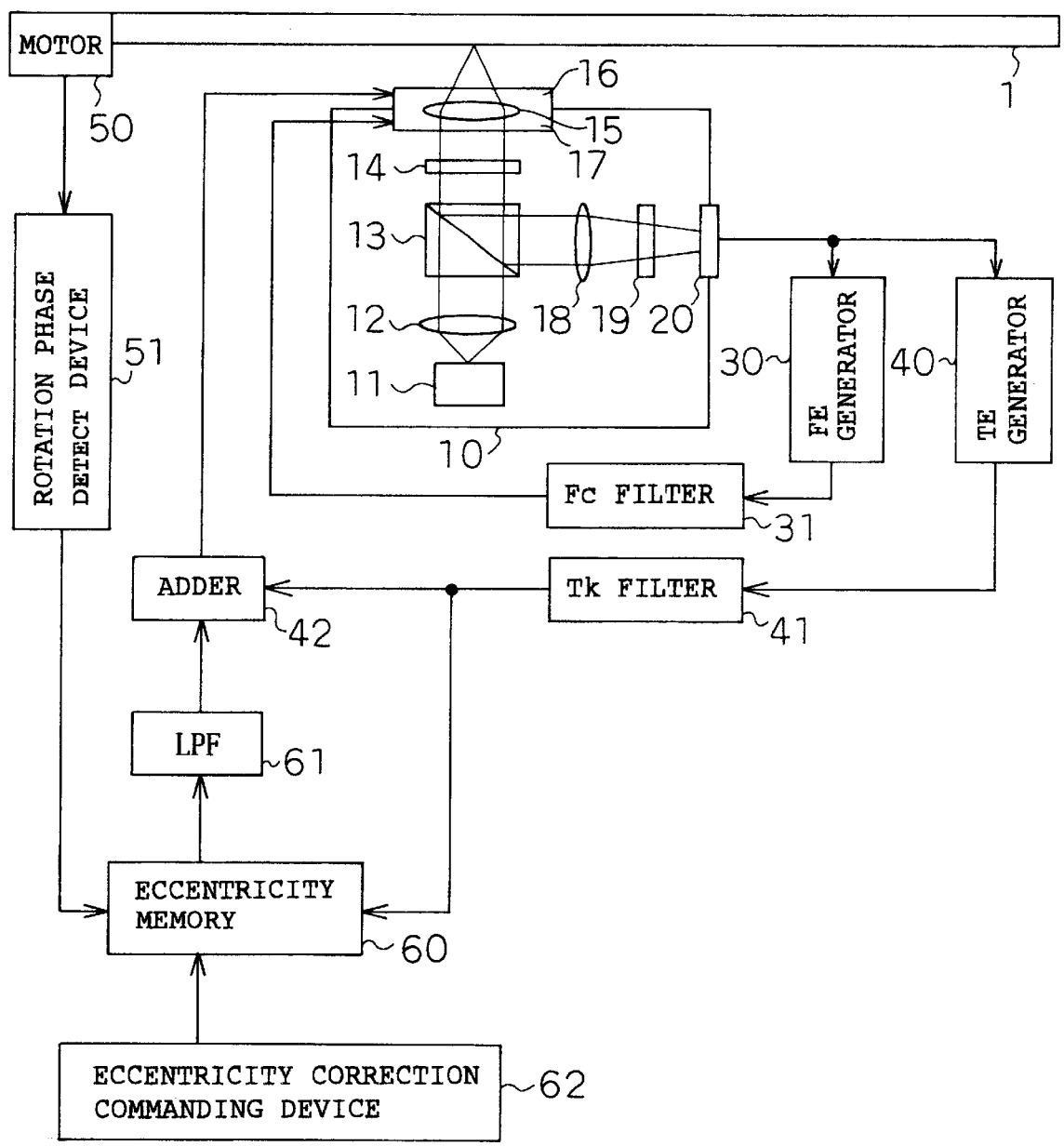
FIG. 16 is a block diagram showing the configuration of a conventional device.
Figure 17:
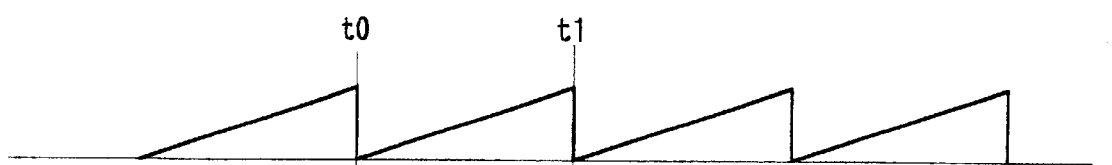
FIG. 17 is a diagram showing the relationship between rotation phase information (FIG. 17a) from a rotation phase detect device according to a conventional example and a control signal (FIG. 17b) from an eccentricity compensation controling signal and an eccentricity correction driving signal (FIG. 17c) from a retrieval managing device from a lowpass filter.
Figure 17:
Figure 17:
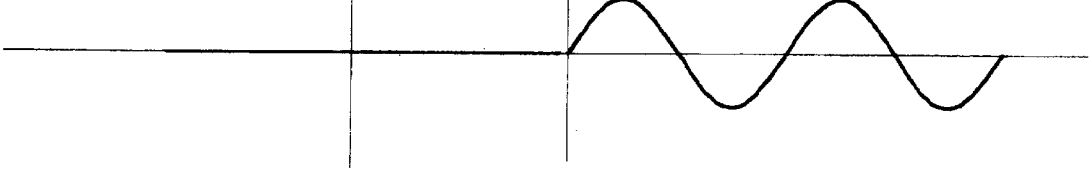
Figures 18A, 18B:
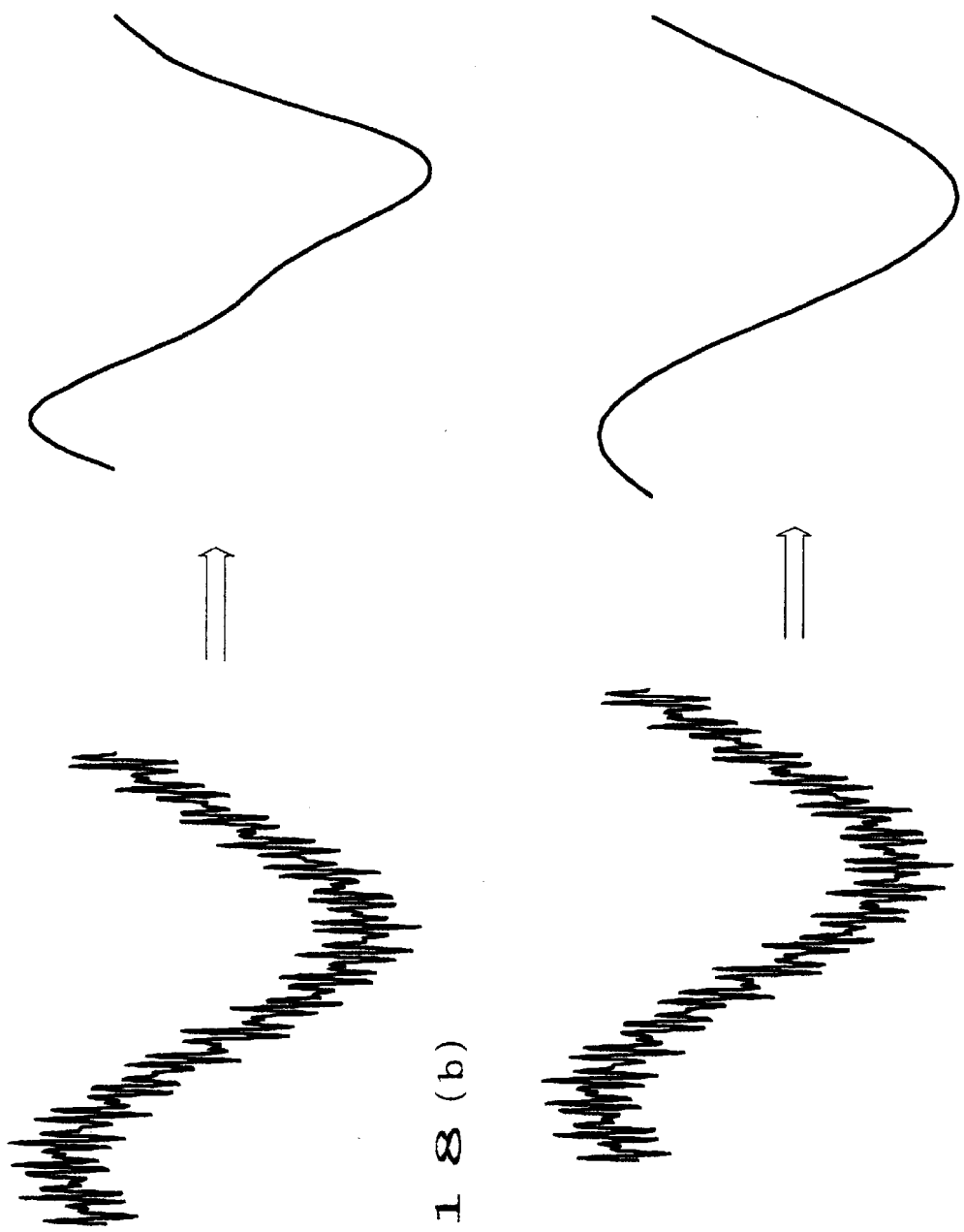
FIG. 18 is a diagram showing the relationship between a tracking driving signal and generated eccentricity correction driving in a conventional example (FIG. 18a) and in Embodiment 1 of the present invention (FIG. 18b).

FIG. 1 shows a block diagram of an optical disc apparatus according to Embodiment 1. Those components in FIG. 1 that are the same as in FIG. 16 have the same reference numerals and description thereof is thus omitted. Rotation phase information from a rotation phase detect device 51 is transmitted to a sine wave generator 64. The sine wave generator 64 transmits a sine wave having a frequency that is the same as a rotation frequency of an optical disc, to an adder 42 via a phase compensating devicer 65 and a gain compensating devicer 66 based on the rotation phase information from the rotation phase detect device 51, and transmits the same signal to a frequency detector 63. An eccentricity compensation controling signal 62 transmits a control signal to the frequency detector 63.

If the control signal from the eccentricity compensation controling signal 62 is at a high level, the frequency detector 63 detects a driving signal from a Tk filter 41 to determine its magnitude and phase based on the frequency of a sine wave from the sine wave generator 64, while simultaneously transmitting zero to the phase compensating devicer 65 and the gain compensating devicer 66. Alternatively, if the control signal from the eccentricity compensation controling signal 62 is at a low level, the frequency detector 63 transmits determined gain and phase information to the gain compensating devicer 66 and the phase compensating devicer 65, respectively. The gain and phase information from the frequency detector 63 has an initial value of zero.

The phase compensating devicer 65 varies the phase of the sine wave from the sine wave generator 64 based on the phase information from the frequency detector 63. The gain compensating devicer 66 varies the gain of the sine wave from the phase compensating devicer 65 based on the gain information from the frequency detector 63. The adder 42 adds a signal from the gain compensating devicer 66 and the signal from the Tk filter 41 together and transmits the resulting signal to a tracking actuator 17.

Figure 2:
FIG. 2 is a diagram showing the relationship between rotation phase information (FIG. 2a) from a rotation phase detect device according to Embodiment 1 of the present invention and a sine signal (FIG. 2b) from a sine wave generator.
Figure 2:
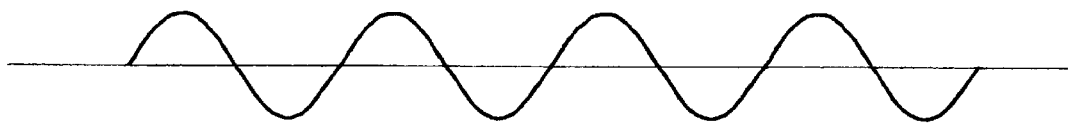

The operation of the sine wave generator 64 will be explained with reference to FIG. 2. FIG. 2a shows a signal from the rotation phase detect device 51, and FIG. 2b shows a signal from the sine wave generator 64. The sine wave generator 64 generates and outputs a sine wave having the same frequency as a signal from the rotation phase detect device 51 as well as predetermined gain and phase. The generated sine waveform has a frequency that is the same as the rotation frequency of the optical disc and acts as a base for generation of an eccentricity correction driving signal.

Figure 3:
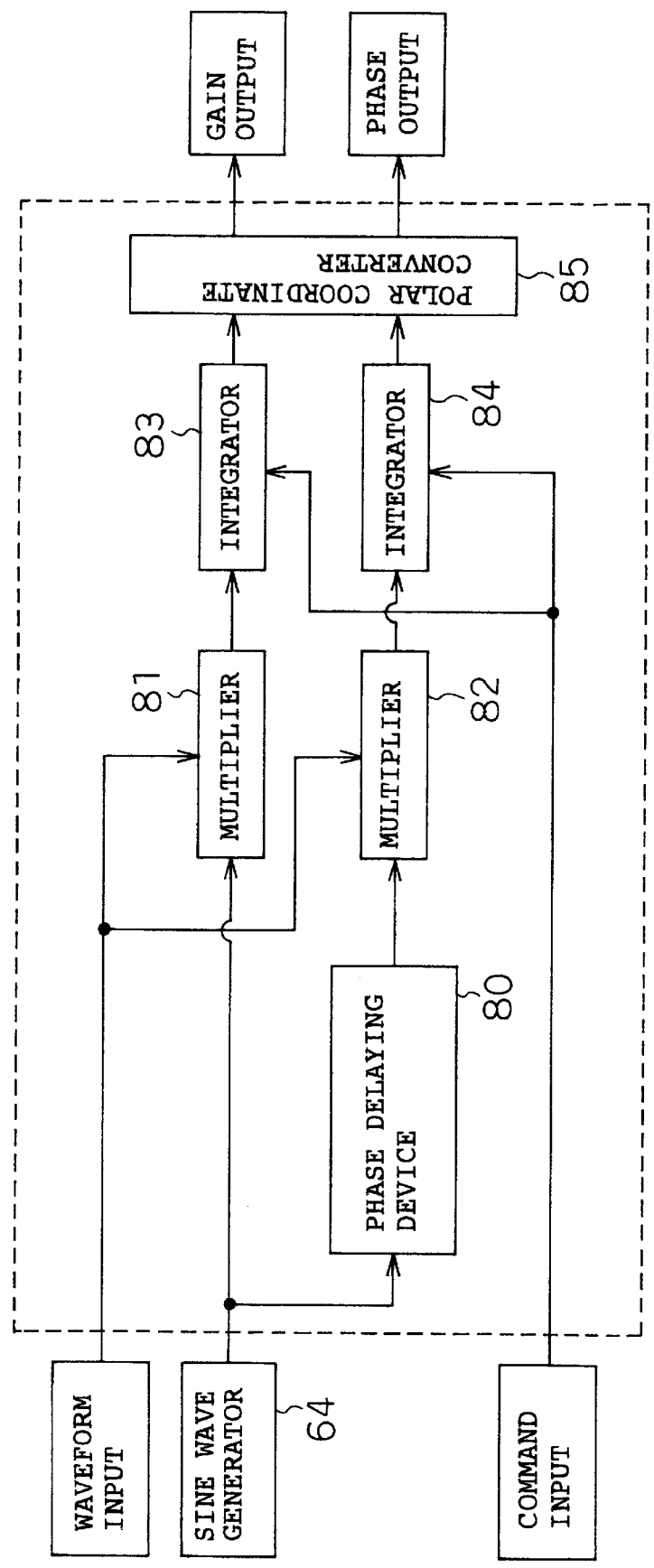
FIG. 3 is a detailed block diagram of a frequency detector according to Embodiment 1 of the present invention.

Since a main component of eccentricity is the rotation frequency of the optical disc, a driving signal from the Tk filter 41 also has the same frequency component and a frequency detector 63 detects the magnitude and direction of the driving signal using the sine wave transmitted from the sine wave generator 64 and having the same frequency. FIG. 3 shows the frequency detector 63 in detail. A waveform input in FIG. 3 indicates the Tk filter 41, a command input therein indicates the eccentricity compensation controlling signal 62, a gain output therein indicates the gain compensating devicer 66, and a phase output therein indicates the phase compensating devicer 65. The signal from the sine wave generator 64 is transmitted to a multiplier 81 and a phase delaying device 80. The phase delaying device 80 delays the phase of the signal from the sine wave generator 64 by $\pi/2$ and then transmits the delayed signal to a multiplier 82. The signal from the Tk filter 41 is transmitted to the multipliers 81 and 82.

The control signal from the eccentricity compensation controling signal 62 is transmitted to integrators 83 and 84. The multiplier 81 multiplies the signal from the sine wave generator 64 and the signal from the Tk filter 41 together and transmits the result to the integrator 83. The multiplier 82 multiplies the signal from the phase delaying device 80 and the signal from the Tk filter 41 together and transmits the result to the integrator 84. When the control signal from the eccentricity compensation controling signal 62 is at a high level, the integrator 83 integrates signals from the multiplier 81 and transmits the result to the coordinate converter 85.

When the control signal from the eccentricity compensation controling signal 62 is at the high level, the integrator 84 integrates signals from the multiplier 82 and transmits the result to the coordinate converter 85. When the control signal from the eccentricity compensation controling signal 62 is at a low level, the integrators 83 and 84 hold and then transmit the integrated values to the coordinate converter 85. On detecting a rising edge in the control signal from the eccentricity compensation controling signal 62, the integrators 83 and 84 clear the integrated values to zero. The coordinate converter 85 considers the integrated values from the integrators 83 and 84 to be orthogonal coordinate expressions, converts them into polar coordinates, and then transmits gain information to the gain compensating devicer 66 while transmitting phase information to the phase compensating devicer 65.

To execute eccentricity correction learning, the eccentricity compensation controling signal 62 changes the control signal from a perpendicularly low level to a high level during a period corresponding to one rotation of the optical disc. The integrators 83 and 84 clear the integrated values to zero when the eccentricity correction learning starts and integrates the results of multiplications for one rotation of the optical disc, that is, one period of eccentricity. A method for using two sine waves having predetermined frequencies as well as a phase difference of $\pi/2$ to multiply and integrate them by and with a target waveform is called "orthogonal heterodyne detection." This provides a real component and an imaginary component of the gain for a predetermined frequency component of the target waveform.

When the gain and phase of the signal from the sine wave generator 64 are used as references, the integrated value from the integrator 83, which is the result of the calculation using the signal from the sine wave generator 64, indicates a real component of the magnitude of the rotation frequency component of the optical disc in the signal from the Tk filter 41, while the integrated value from the integrator 84, which is the result of the calculation using the signal from the phase delaying device 80, indicates an imaginary component of the magnitude of the rotation frequency component of the optical disc in the signal from the Tk filter 41. By using the coordinate converter 85 to convert the real and imaginary components of the magnitude of the rotation frequency component of the optical disc in the signal from the Tk filter 41, the magnitude and phase of the rotation frequency component of the optical disc in the signal from the Tk filter 41 are obtained.

The signal from the sine wave generator 64 has its phase corrected by the phase compensating devicer 65 depending on phase information on the determined eccentricity correction driving, and has its gain corrected by the gain compensating devicer 66 depending on gain information on the determined eccentricity correction driving. Sinusoidal wave eccentricity correction driving dependent on the magnitude and phase of eccentricity is thus obtained. This eccentricity correction driving has only the rotation frequency component of the optical disc and is free from factors such as noise, thereby enabling accurate eccentricity corrections.

(Embodiment 2)

Figure 4:
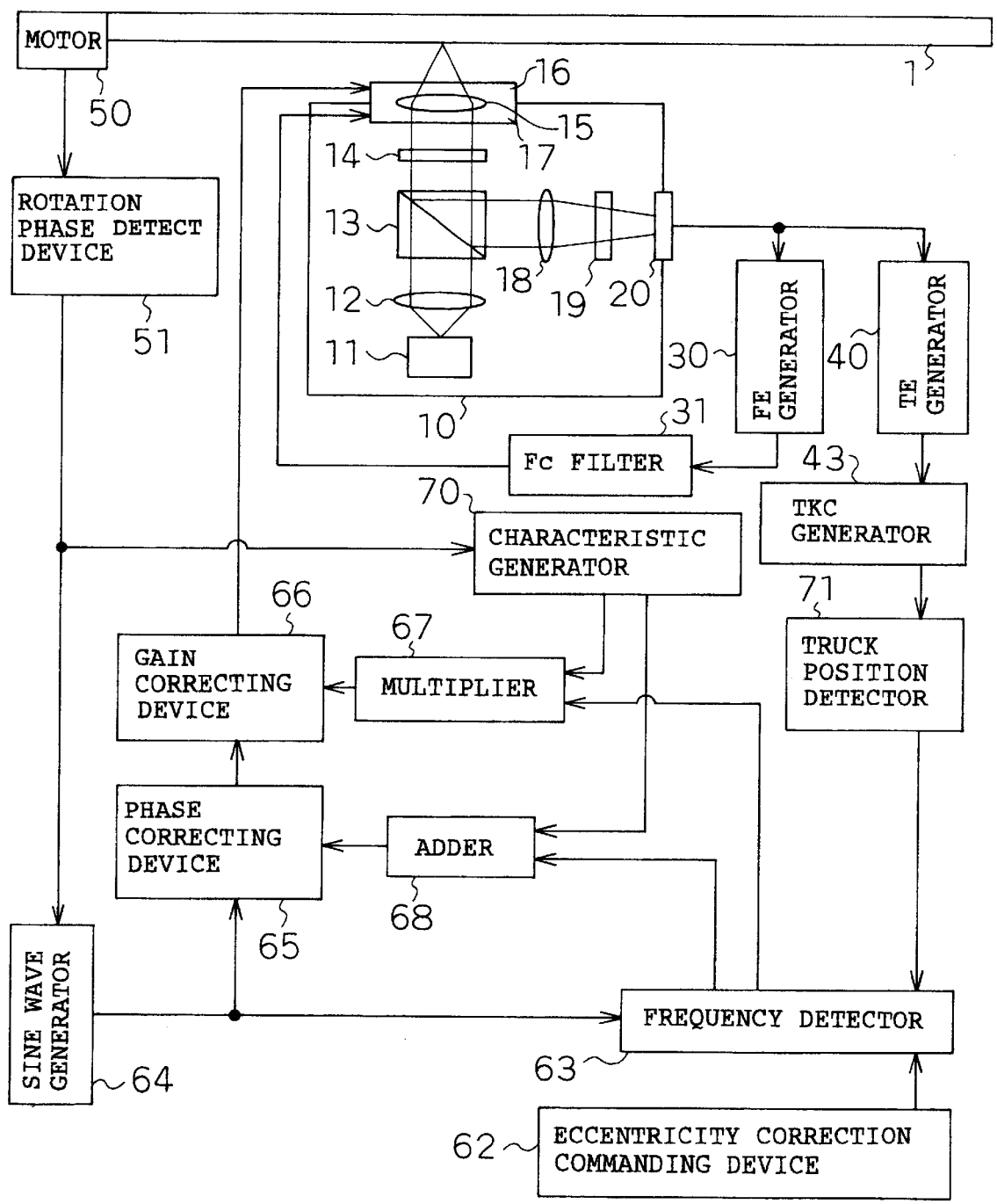
FIG. 4 is a block diagram showing the configuration of Embodiment 2 of the present invention.

FIG. 4 shows a block diagram of an optical disc apparatus according to Embodiment 2. Those components in FIG. 4 that are the same as in FIG. 16 have the same reference numerals and description thereof is thus omitted. Rotation phase information from the rotation phase detect device 51 is transmitted to the sine wave generator 64 and a characteristic generator 70. The sine wave generator 64 transmits a sine wave having a frequency that is the same as the rotation frequency, to a tracking actuator 17 via the phase compensating devicer 65 and the gain compensating devicer 66 based on the rotation phase information from the rotation phase detect device 51, and transmits the same signal to the frequency detector 63. The eccentricity compensation controling signal 62 transmits the control signal to the frequency detector 63.

In a tracking non-control state, a tracking error signal from the TE generator 40 has one period of waveform for one track. The tracking error signal is binarized by a track cross generator 43 and then transmitted to a track position detector 71. The track position detector 71 counts rising edges in the track cross signal from the track cross generator 43 and multiplies the count value by the interval between tracks of the optical disc to generate a track position, which is then transmitted to the frequency detector 63.

If the control signal from the eccentricity compensation controling signal 62 is at a high level, the frequency detector 63 detects a track position signal from the track position detector 71 to determine its gain and phase based on the frequency of a sine wave from the sine wave generator 64, while simultaneously transmitting zero to an adder 68 and a multiplier 67. Alternatively, if the control signal from the eccentricity compensation controling signal 62 is at a low level, the frequency detector 63 transmits the determined gain and phase information to the multiplier 67 and the adder 68, respectively. The gain and phase information from the frequency detector 63 has an initial value of zero.

The characteristic generator 70 has gain and phase information on an inverse transfer characteristic of the tracking actuator 17 and detects a rotation frequency from the rotation phase information from the rotation phase detect device 51 to transmit gain and phase information dependent on the determined frequency to the multiplier 67 and the adder 68, respectively.

Since the inverse transfer characteristic of the tracking actuator 17 indicates what driving signal is obtained for a tracking position signal, gain and phase information is determined to correct the measured tracking position signal.

The multiplier 67 multiplies the gain information from the frequency detector 63 and characteristic generator 70 together and then transmits the result to the gain compensating devicer 66. The adder 68 adds the phase information from the frequency detector 63 and characteristic generator 70 together and then transmits the result to the phase compensating devicer 65.

The phase compensating devicer 65 varies the phase of the sine wave from the sine wave generator 64 based on the phase information from the adder 68. The gain compensating devicer 66 varies the gain of the sine wave from the phase compensating devicer 65 based on the gain information from the multiplier 67, and transmits the result to the tracking actuator 17.

The operation of the sine wave generator 64 will be explained with reference to FIG. 2. FIG. 2a shows a signal from the rotation phase detect device 51, and FIG. 2b shows a signal from the sine wave generator 64. The sine wave generator 64 generates and outputs a sine wave having the same period as a signal from the rotation phase detect device 51 as well as predetermined gain and phase. The generated sine waveform has a frequency that is the same as the rotation frequency of the optical disc and acts as a base for generation of an eccentricity correction driving signal.

Since a main component of eccentricity is the rotation frequency of the optical disc, the track position signal from the track position detector 71 also has the same frequency component and the frequency detector 63 detects the magnitude and direction of the track position signal using the sine wave transmitted from the sine wave generator 64 and having the same frequency. FIG. 3 shows the frequency detector 63 in detail. A waveform input in FIG. 3 indicates the track position detector 71, a command input therein indicates the eccentricity compensation controling signal 62, a gain output therein indicates the multiplier 67, and a phase output therein indicates the adder 68.

The signal from the sine wave generator 64 is transmitted to the multiplier 81 and the phase delaying device 80. The phase delaying device 80 delays the phase of the signal from the sine wave generator 64 by $\pi/2$ and then transmits the delayed signal to the multiplier 82. The track position signal from the track position detector 71 is transmitted to the multipliers 81 and 82. The control signal from the eccentricity compensation controling signal 62 is transmitted to the integrators 83 and 84. The multiplier 81 multiplies the signal from the sine wave generator 64 and the track position signal from the track position detector 71 together and transmits the result to the integrator 83. The multiplier 82 multiplies the signal from the phase delaying device 80 and the track position signal from the track position detector 71 together and transmits the result to the integrator 84.

When the control signal from the eccentricity compensation controling signal 62 is at the high level, the integrator 83 integrates signals from the multiplier 81 and transmits the result to the coordinate converter 85. When the control signal from the eccentricity compensation controling signal 62 is at the high level, the integrator 84 integrates signals from the multiplier 82 and transmits the result to the coordinate converter 85. When the control signal from the eccentricity compensation controling signal 62 is at the low level, the integrators 83 and 84 hold and then transmit the integrated values to the coordinate converter 85.

On detecting a rising edge in the control signal from the eccentricity compensation controling signal 62, the integrators 83 and 84 clear the integrated values to zero. The coordinate converter 85 considers the integrated values from the integrators 83 and 84 to be orthogonal coordinate expressions, converts them into polar coordinates, and then transmits gain information to the multiplier 67 while transmitting phase information to the adder 68.

To execute the eccentricity correction learning, the eccentricity compensation controling signal 62 changes the control signal from a perpendicularly low level to a high level and maintains this level only for a period corresponding to one rotation of the optical disc. The integrators 83 and 84 clear the integrated values to zero when the eccentricity correction learning starts and integrates the results of multiplications for one rotation of the optical disc, that is, one period of eccentricity. A method for using two sine waves having predetermined frequencies as well as a phase difference of $\pi/2$ to multiply and integrate them by and with a target waveform is called "orthogonal heterodyne detection." This provides a real component and an imaginary component of the gain for a predetermined frequency component of the target waveform.

When the gain and phase of the signal from the sine wave generator 64 are used as references, the integrated value from the integrator 83, which is the result of the calculation using the signal from the sine wave generator 64, indicates a real component of the magnitude of the rotation frequency component of the optical disc in the track position signal from the track position detector 71, while the integrated value from the integrator 84, which is the result of the calculation using the signal from the phase delaying device 80, indicates an imaginary component of the magnitude of the rotation frequency component of the optical disc in the track position signal from the track position detector 71.

By using the coordinate converter 85 to convert the real and imaginary components of the magnitude of the rotation frequency component of the optical disc in the track position signal from the track position detector 71, the magnitude and phase of the rotation frequency component of the optical disc in the track position signal from the track position detector 71 are obtained.

The characteristic generator 70 generates gain and phase information on the inverse transfer characteristic of the tracking actuator 17 for the rotation frequency of the optical disc.

The multiplier 67 multiplies the gain information based on the tracking position signal from the frequency detector 63, by the gain information from the characteristic generator 70 to obtain gain information for the eccentricity correction driving. The adder 68 adds the phase information based on the tracking position signal from the frequency detector 63 to the phase information from the characteristic generator 70 to obtain phase information for the eccentricity correction driving.

The signal from the sine wave generator 64 has its phase corrected by the phase compensating devicer 65 depending on the determined phase information on the eccentricity correction driving, and has its gain corrected by the gain compensating devicer 66 depending on the determined gain information on the eccentricity correction driving. Sinusoidal wave eccentricity correction driving dependent on the magnitude and phase of eccentricity is thus obtained. This eccentricity correction driving has only the rotation frequency component of the optical disc and is free from factors such as noise, thereby enabling accurate eccentricity corrections.

(Embodiment 3)

Figure 5:
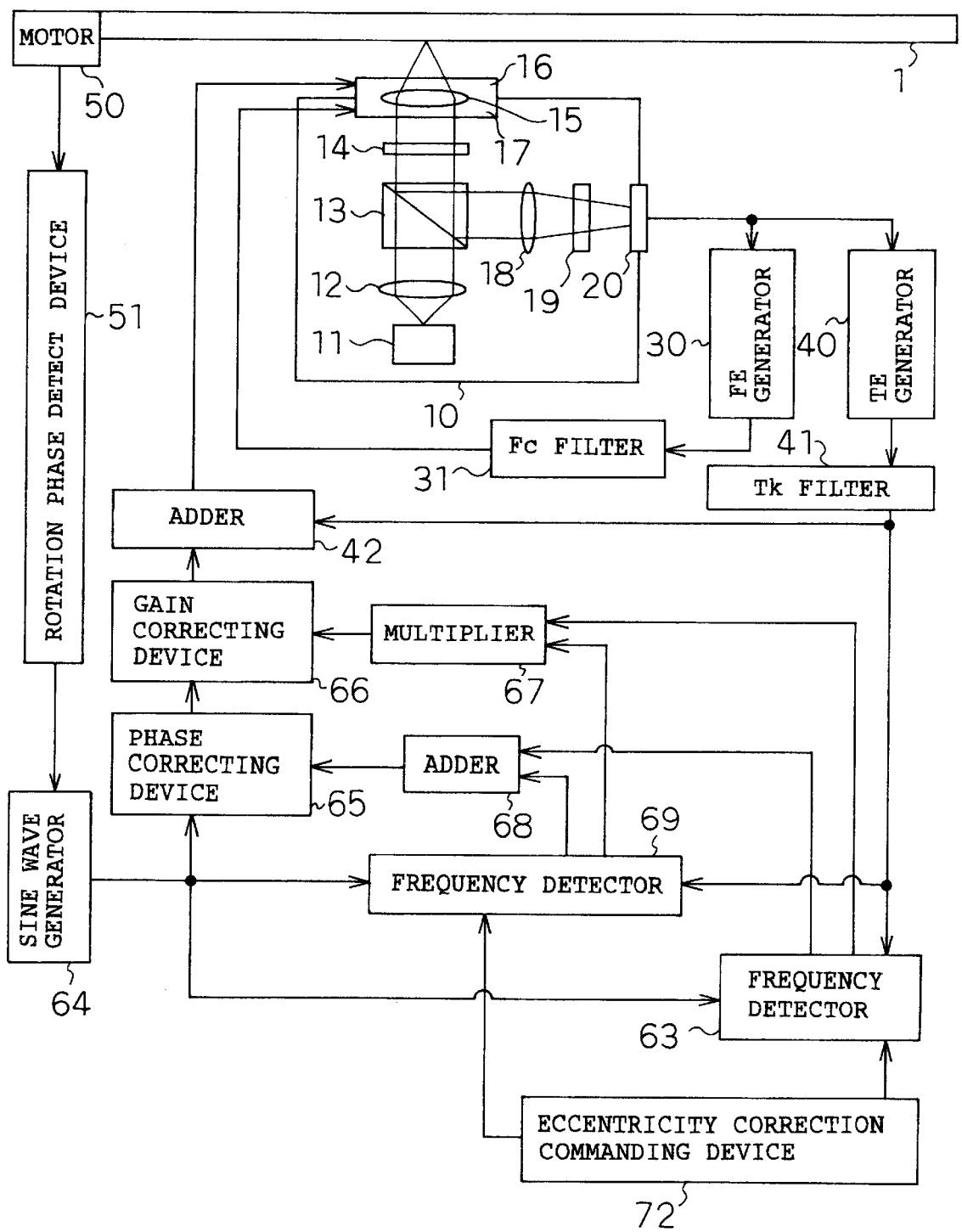
FIG. 5 is a block diagram showing the configuration of Embodiment 3 of the present invention.

FIG. 5 shows a block diagram of an optical disc apparatus according to Embodiment 3. Those components in FIG. 5 that are the same as in FIG. 16 have the same reference numerals and description thereof is thus omitted. Rotation phase information from the rotation phase detect device 51 is transmitted to the sine wave generator 64. The sine wave generator 64 transmits a sine wave having a frequency that is the same as a rotation frequency, to the adder 42 via the phase compensating devicer 65 and the gain compensating devicer 66 based on the rotation phase information from the rotation phase detect device 51, and transmits the same signal to the frequency detector 63 and a frequency detector 69.

The eccentricity compensation controling signal 72 transmits separate control signals to the frequency detectors 63 and 69 respectively. If the control signal from the eccentricity compensation controling signal 72 is at a high level, the frequency detector 63 detects a driving signal from the Tk filter 41 to determine its gain and phase based on the frequency of a sine wave from the sine wave generator 64, while simultaneously transmitting zero to the adder 68 and the multiplier 67.

Alternatively, if the control signal from the eccentricity compensation controling signal 72 is at a low level, the frequency detector 63 transmits determined gain and phase information to the multiplier 67 and the adder 68, respectively. The gain and phase information from the frequency detector 63 has an initial value of zero.

If the control signal from the eccentricity compensation controling signal 72 is at the high level, the frequency detector 69 detects the driving signal from the Tk filter 41 to determine its gain and phase based on the frequency of the sine wave from the sine wave generator 64, while simultaneously transmitting zero to the adder 68 and one to the multiplier 67. Alternatively, if the control signal from the eccentricity compensation controling signal 72 is at the low level, the frequency detector 69 transmits determined gain and phase information to the multiplier 67 and the adder 68, respectively. The gain information from the frequency detector 69 has an initial value of one, whereas the phase information from the frequency detector 69 has an initial value of zero.

The multiplier 67 multiplies the gain information from the frequency detectors 63 and 69 together and then transmits the result to the gain compensating devicer 66. The adder 68 adds the phase information from the frequency detectors 63 and 69 together and then transmits the result to the phase compensating devicer 65. The phase compensating devicer 65 varies the phase of the sine wave from the sine wave generator 64 based on the phase information from the adder 68. The gain compensating devicer 66 varies the gain of the sine wave from the phase compensating devicer 65 based on the gain information from the multiplier 67. The adder 42 adds a signal from the gain compensating devicer 66 and the signal from the Tk filter 41 together and transmits the resulting signal to the tracking actuator 17.

The operation of the sine wave generator 64 will be explained with reference to FIG. 2. FIG. 2a shows a signal from the rotation phase detect device 51, and FIG. 2b shows a signal from the sine wave generator 64. The sine wave generator 64 generates and outputs a sine wave having the same frequency as a signal from the rotation phase detect device 51 as well as predetermined gain and phase. The generated sine waveform has a frequency that is the same as the rotation frequency of the optical disc and acts as a base for generation of an eccentricity correction driving signal.

Since a main component of eccentricity is the rotation frequency of the optical disc, a driving signal from the Tk filter 41 also has the same frequency component and a frequency detector 63 detects the magnitude and direction of the driving signal using the sine wave transmitted from the sine wave generator 64 and having the same frequency. FIG. 3 shows the frequency detector 63 in detail. A waveform input in FIG. 3 indicates the Tk filter 41, a command input therein indicates the eccentricity compensation controling signal 72, a gain output therein indicates the multiplier 67, and a phase output therein indicates the adder 68. The signal from the sine wave generator 64 is transmitted to the multiplier 81 and the phase delaying device 80.

The phase delaying device 80 delays the phase of the signal from the sine wave generator 64 by $\pi/2$ and then transmits the delayed signal to the multiplier 82. The signal from the Tk filter 41 is transmitted to the multipliers 81 and 82. The control signal from the eccentricity compensation controling signal 62 is transmitted to the integrators 83 and 84. The multiplier 81 multiplies the signal from the sine wave generator 64 and the signal from the Tk filter 41 together and transmits the result to the integrator 83. The multiplier 82 multiplies the signal from the phase delaying device 80 and the signal from the Tk filter 41 together and transmits the result to the integrator 84.

When the control signal from the eccentricity compensation controling signal 62 is at the high level, the integrator 83 integrates signals from the multiplier 81 and transmits the result to the coordinate converter 85. When the control signal from the eccentricity compensation controling signal 62 is at the high level, the integrator 84 integrates signals from the multiplier 82 and transmits the result to the coordinate converter 85. When the control signal from the eccentricity compensation controling signal 62 is at the low level, the integrators 83 and 84 hold and then transmit the integrated values to the coordinate converter 85.

On detecting a rising edge in the control signal from the eccentricity compensation controling signal 62, the integrators 83 and 84 clear the integrated values to zero. The coordinate converter 85 considers the integrated values from the integrators 83 and 84 to be orthogonal coordinate expressions, converts them into polar coordinates, and then transmits gain information to the multiplier 67 while transmitting phase information to the adder 68. The frequency detector 69 is configured similarly to the frequency detector 63.

To accurately correct eccentricity, the present embodiment executes the eccentricity correction learning in two stages.

To execute a first-stage eccentricity correction learning, the eccentricity compensation controling signal 72 changes the control signal to the frequency detector 63 from a perpendicularly low level to a high level and maintains this level only for a period corresponding to one rotation of the optical disc. The integrators 83 and 84 clear the integrated values to zero when the eccentricity correction learning starts and integrate the results of multiplications for one rotation of the optical disc, that is, one period of eccentricity. A method for using two sine waves having predetermined frequencies as well as a phase difference of $\pi/2$ to multiply and integrate them by and with a target waveform is called "orthogonal heterodyne detection." This provides a real component and an imaginary component of the gain for a predetermined frequency component of the target waveform.

When the gain and phase of the signal from the sine wave generator 64 are used as references, the integrated value from the integrator 83, which is the result of the calculation using the signal from the sine wave generator 64, indicates a real component of the magnitude of the rotation frequency component of the optical disc in the signal from the Tk filter 41, while the integrated value from the integrator 84, which is the result of the calculation using the signal from the phase delaying device 80, indicates an imaginary component of the magnitude of the rotation frequency component of the optical disc in the signal from the Tk filter 41.

By using the coordinate converter 85 to convert the real and imaginary components of the magnitude of the rotation frequency component of the optical disc in the signal from the Tk filter 41, the magnitude and phase of the rotation frequency component of the optical disc in the signal from the Tk filter 41 are obtained.

The multiplier 67 multiplies the gain information from the frequency detector 63 by the initial value of 1 from the frequency detector 69 to generate gain information for the first-stage eccentricity correction driving. The adder 68 adds the phase information from the frequency detector 63 to the initial value of 0 from the frequency detector 69 to generate phase information for the first-stage eccentricity correction driving. The signal from the sine wave generator 64 has its phase corrected by the phase compensating devicer 65 depending on the determined phase information on the first-stage eccentricity correction driving, and has its gain corrected by the gain compensating devicer 66 depending on the determined gain information on the first-stage eccentricity correction driving. Sinusoidal wave first-stage eccentricity correction driving dependent on the magnitude and phase of eccentricity is thus obtained.

With the determined first-stage eccentricity correction driving applied, to execute a second-stage eccentricity correction learning, the eccentricity compensation controling signal 72 changes the control signal to the frequency detector 69 from a perpendicularly low level to a high level and maintains this level only for a period corresponding to one rotation of the optical disc. Similarly to the frequency detector 63 in the first stage, the frequency detector 69 obtains gain and phase information on the rotation frequency component of the optical disc for the residual eccentricity in the driving signal from the Tk filter 41.

The multiplier 67 multiplies the gain information from the frequency detector 63 by the gain information from the frequency detector 69 to obtain gain information for the second-stage eccentricity correction driving. The adder 68 adds the phase information from the frequency detector 64 to the phase information from the frequency detector 69 to obtain phase information for the second-stage eccentricity correction driving.

The signal from the sine wave generator 64 has its phase corrected by the phase compensating devicer 65 depending on the determined phase information on the second-stage eccentricity correction driving, and has its gain corrected by the gain compensating devicer 66 depending on the determined gain information on the second-stage eccentricity correction driving. Sinusoidal second-stage eccentricity correction driving dependent on the magnitude and phase of eccentricity is thus obtained. The second-stage eccentricity correction driving is more accurate than the first-stage eccentricity correction driving because it corrects the residue of the state with the first-stage eccentricity correction driving applied.

In this embodiment, the eccentricity correction learning is carried out twice, but it may be executed more times.
(Embodiment 4)

Figure 6:
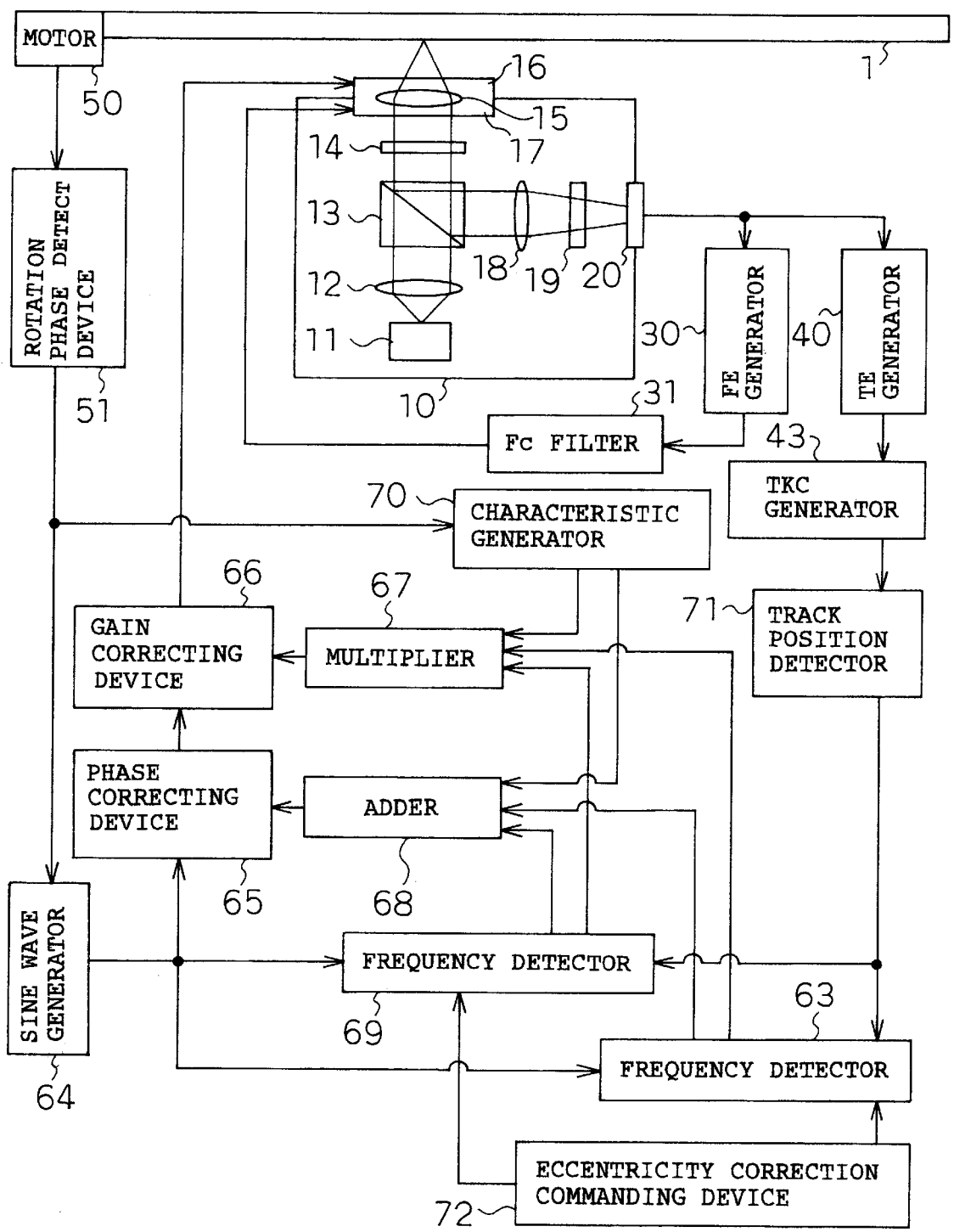
FIG. 6 is a block diagram showing the configuration of Embodiment 4 of the present invention.

FIG. 6 shows a block diagram of an optical disc apparatus according to Embodiment 4. Those components in FIG. 6 that are the same as in FIG. 16 have the same reference numerals and description thereof is thus omitted. Rotation phase information from the rotation phase detect device 51 is transmitted to the sine wave generator 64 and a characteristic generator 70. The sine wave generator 64 transmits a sine wave having a frequency that is the same as the rotation frequency, to the tracking actuator 17 via the phase compensating devicer 65 and the gain compensating devicer 66 based on the rotation phase information from the rotation phase detect device 51, and transmits the same signal to the frequency detectors 63 and 69. The eccentricity compensation controling signal 72 transmits separate control signals to the frequency detectors 63 and 69 respectively.

In a tracking non-control state, a tracking error signal from the TE generator 40 has one period of waveform for one track. The tracking error signal is binarized by the track cross generator 43 and then transmitted to the track position detector 71. The track position detector 71 counts rising edges in the track cross signal from the track cross generator 43 and multiplies the count value by the interval between tracks of the optical disc to generate a track position, which is then transmitted to the frequency detectors 63 and 69.

If the control signal from the eccentricity compensation controling signal 72 is at a high level, the frequency detector 63 detects a track position signal from the track position detector 71 to determine its gain and phase based on the frequency of a sine wave from the sine wave generator 64, while simultaneously transmitting zero to the adder 68 and the multiplier 67. Alternatively, if the control signal from the eccentricity compensation controling signal 72 is at a low level, the frequency detector 63 transmits the determined gain and phase information to the multiplier 67 and the adder 68, respectively. The gain and phase information from the frequency detector 63 has an initial value of zero.

If the control signal from the eccentricity compensation controling signal 72 is at the high level, the frequency detector 69 detects the track position signal from the track position detector 71 to determine its gain and phase based on the frequency of the sine wave from the sine wave generator 64, while simultaneously transmitting zero to the adder 68 and one to the multiplier 67. Alternatively, if the control signal from the eccentricity compensation controling signal 72 is at the low level, the frequency detector 69 transmits determined gain and phase information to the multiplier 67 and the adder 68, respectively. The gain information from the frequency detector 69 has an initial value of one, whereas the phase information from the frequency detector 69 has an initial value of zero.

The characteristic generator 70 has gain and phase information on an inverse transfer characteristic of the tracking actuator 17 and detects a rotation frequency from the rotation phase information from the rotation phase detect device 51 to transmit gain and phase information dependent on the determined frequency to the multiplier 67 and the adder 68, respectively. Since the inverse transfer characteristic of the tracking actuator 17 indicates what driving signal is obtained for a tracking position signal, gain and phase information is determined to correct the measured tracking position signal.

The multiplier 67 multiplies the gain information from the frequency detectors 63 and 69 and characteristic generator 70 together and then transmits the result to the gain compensating devicer 66. The adder 68 adds the phase information from the frequency detectors 63 and 69 and characteristic generator 70 together and transmits the result to the phase compensating devicer 65. The phase compensating devicer 65 varies the phase of the sine wave from the sine wave generator 64 based on the phase information from the adder 68. The gain compensating devicer 66 varies the gain of the sine wave from the phase compensating devicer 65 based on the gain information from the multiplier 67.

The operation of the sine wave generator 64 will be explained with reference to FIG. 2. FIG. 2a shows a signal from the rotation phase detect device 51, and FIG. 2b shows a signal from the sine wave generator 64. The sine wave generator 64 generates and outputs a sine wave having the same frequency as a signal from the rotation phase detect device 51 as well as predetermined gain and phase. The generated sine waveform has a frequency that is the same as the rotation frequency of the optical disc and acts as a base for generation of an eccentricity correction driving signal.

In the tracking non-control state, the tracking error signal from the TE generator 40 has one period of waveform for one track. One rising edge in a signal binarized by a track cross generator 43 is present for the one track. The track position detector 71 counts rising edges in the signal from the track cross generator 43 and multiplies the count value by the interval between tracks of the optical disc to generate the track position.

Since a main component of eccentricity is the rotation frequency of the optical disc, the track position signal from the track position detector 71 also has the same frequency component and the frequency detector 63 detects the magnitude and direction of the track position signal using the sine wave transmitted from the sine wave generator 64 and having the same frequency. FIG. 3 shows the frequency detector 63 in detail. A waveform input in FIG. 3 indicates the track position detector 71, a command input therein indicates the eccentricity compensation controling signal 62, a gain output therein indicates the multiplier 67, and a phase output therein indicates the adder 68.

The signal from the sine wave generator 64 is transmitted to the multiplier 81 and the phase delaying device 80. The phase delaying device 80 delays the phase of the signal from the sine wave generator 64 by $\pi/2$ and then transmits the delayed signal to the multiplier 82. The track position signal from the track position detector 71 is transmitted to the multipliers 81 and 82. The control signal from the eccentricity compensation controling signal 62 is transmitted to the integrators 83 and 84. The multiplier 81 multiplies the signal from the sine wave generator 64 and the track position signal from the track position detector 71 together and transmits the result to the integrator 83. The multiplier 82 multiplies the signal from the phase delaying device 80 and the track position signal from the track position detector 71 together and transmits the result to the integrator 84.

When the control signal from the eccentricity compensation controling signal 62 is at the high level, the integrator 83 integrates signals from the multiplier 81 and transmits the result to the coordinate converter 85. When the control signal from the eccentricity compensation controling signal 62 is at the high level, the integrator 84 integrates signals from the multiplier 82 and transmits the result to the coordinate converter 85. When the control signal from the eccentricity compensation controling signal 62 is at the low level, the integrators 83 and 84 hold and then transmit the integrated values to the coordinate converter 85.

On detecting a rising edge in the control signal from the eccentricity compensation controling signal 62, the integrators 83 and 84 clear the integrated values to zero. The coordinate converter 85 considers the integrated values from the integrators 83 and 84 to be orthogonal coordinate expressions, converts them into polar coordinates, and then transmits gain information to the multiplier 67 while transmitting phase information to the adder 68. The frequency detector 69 is configured similarly to the frequency detector 63.

To accurately correct eccentricity, the present embodiment executes the eccentricity correction learning in two stages.

To execute a first-stage eccentricity correction learning, the eccentricity compensation controling signal 72 changes the control signal to the frequency detector 63 from a perpendicularly low level to a high level and maintains this level for a period corresponding to one rotation of the optical disc. The integrators 83 and 84 clear the integrated values to zero when the eccentricity correction learning starts and integrate the results of multiplications for one rotation of the optical disc, that is, one period of eccentricity. A method for using two sine waves having predetermined frequencies as well as a phase difference of $\pi/2$ to multiply and integrate them by and with a target waveform is called "orthogonal heterodyne detection." This provides a real component and an imaginary component of the gain for a predetermined frequency component of the target waveform.

When the gain and phase of the signal from the sine wave generator 64 are used as references, the integrated value from the integrator 83, which is the result of the calculation using the signal from the sine wave generator 64, indicates a real component of the magnitude of the rotation frequency component of the optical disc in the track position signal from the track position detector 71, while the integrated value from the integrator 84, which is the result of the calculation using the signal from the phase delaying device 80, indicates an imaginary component of the magnitude of the rotation frequency component of the optical disc in the track position signal from the track position detector 71.

By using the coordinate converter 85 to convert the real and imaginary components of the magnitude of the rotation frequency component of the optical disc in the track position signal from the track position detector 71, the magnitude and phase of the rotation frequency component of the optical disc in the track position signal from the track position detector 71 are obtained.

The characteristic generator 70 generates gain and phase information on the inverse transfer characteristic of the tracking actuator 17 for the rotation frequency of the optical disc.

The multiplier 67 multiplies the gain information from the frequency detector 63, the gain information from the characteristic generator 70, and the initial value of 1 from the frequency detector 69 together to generate gain information for the first-stage eccentricity correction driving. The adder 68 adds the phase information from the frequency detector 63, the phase information from the characteristic generator 70, and the initial value of 0 from the frequency detector 69 together to generate phase information for the first-stage eccentricity correction driving. The signal from the sine wave generator 64 has its phase corrected by the phase compensating devicer 65 depending on the determined phase information on the first-stage eccentricity correction driving, and has its gain corrected by the gain compensating devicer 66 depending on the determined gain information on the first-stage eccentricity correction driving. Sinusoidal first-stage eccentricity correction driving dependent on the magnitude and phase of eccentricity is thus obtained.

With the determined first-stage eccentricity correction driving applied, to execute a second-stage eccentricity correction learning, the eccentricity compensation controling signal 72 changes the control signal to the frequency detector 69 from a perpendicularly low level to a high level and maintains this level for a period corresponding to one rotation of the optical disc. Using as references the gain and phase information in the signal from the sine wave generator 64, the frequency detector 69 obtains gain and phase information on the rotation frequency component of the optical disc for the residual eccentricity in the track position signal from the track position detector 71.

The multiplier 67 multiplies the gain information from the frequency detector 63, the gain information from the characteristic generator 70, and the gain information from the frequency detector 69 together to obtain gain information for the second-stage eccentricity correction driving. The adder 68 adds the phase information from the frequency detector 64, the phase information from the characteristic generator 70, and the phase information from the frequency detector 69 together to obtain phase information for the second-stage eccentricity correction driving.

The signal from the sine wave generator 64 has its phase corrected by the phase compensating devicer 65 depending on the determined phase information on the second-stage eccentricity correction driving, and has its gain corrected by the gain compensating devicer 66 depending on the determined gain information on the second-stage eccentricity correction driving. Sinusoidal second-stage eccentricity correction driving dependent on the magnitude and phase of eccentricity is thus obtained. The second-stage eccentricity correction driving is more accurate than the first-stage eccentricity correction driving because it corrects the residue of the state with the first-stage eccentricity correction driving applied. In this embodiment, the eccentricity correction learning is carried out twice, but it may be executed more times.

(Embodiment 5)

Figure 7:
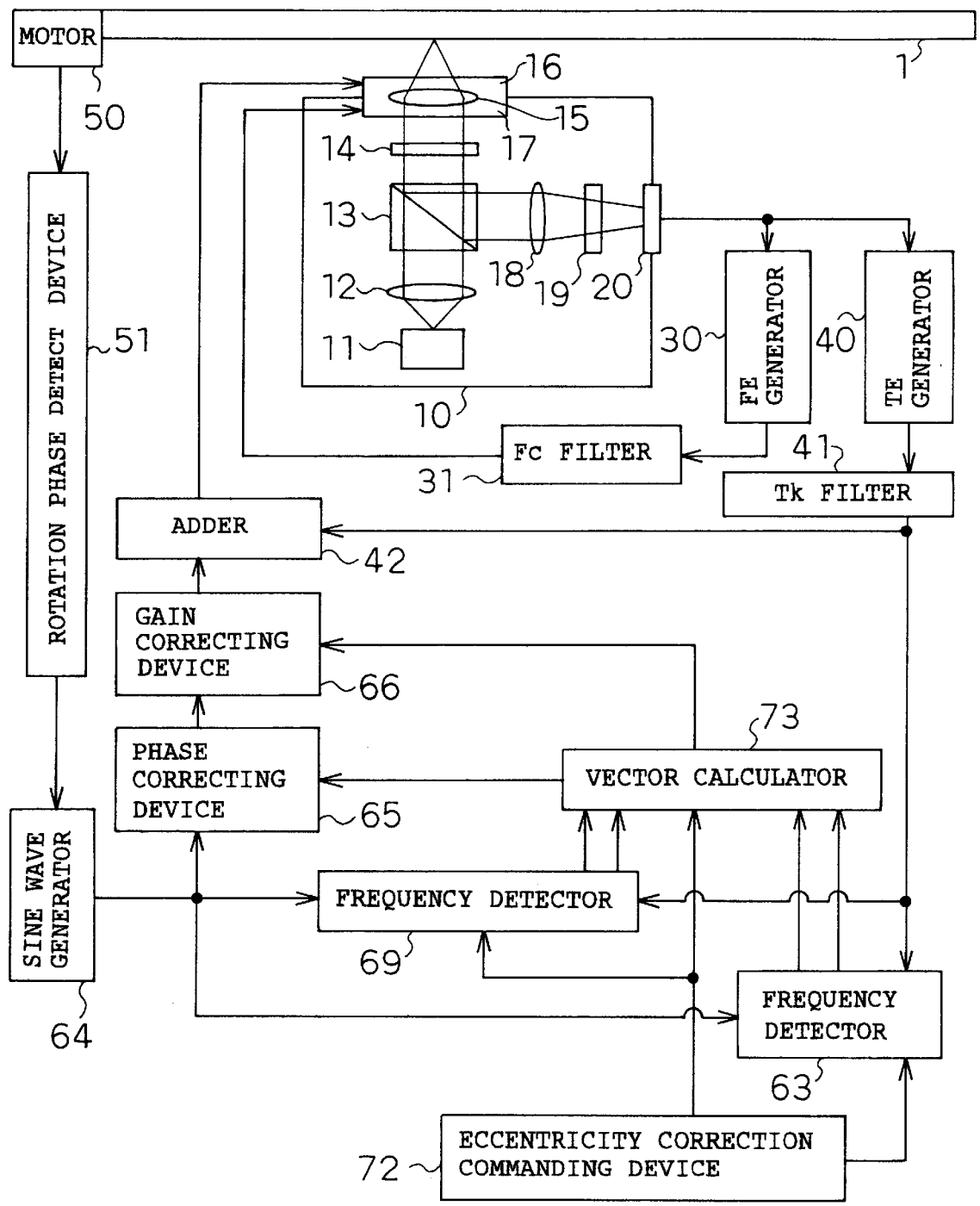
FIG. 7 is a block diagram showing the configuration of Embodiment 5 of the present invention.

FIG. 7 shows a block diagram of an optical disc apparatus according to Embodiment 5. Those components in FIG. 7 that are the same as in FIG. 16 have the same reference numerals and description thereof is thus omitted. Rotation phase information from the rotation phase detect device 51 is transmitted to the sine wave generator 64. The sine wave generator 64 transmits a sine wave having a frequency that is the same as a rotation frequency of an optical disc, to the adder 42 via the phase compensating devicer 65 and the gain compensating devicer 66 based on the rotation phase information from the rotation phase detect device 51, and transmits the same signal to the frequency detector 63 and a frequency detector 69. The eccentricity compensation controling signal 72 transmits separate control signals to the frequency detectors 63 and 69.

The eccentricity compensation controling signal 72 transmits the signal sent to the frequency detector 69, to a vector calculator 73 at the same time.

If the control signal from the eccentricity compensation controling signal 72 is at a high level, the frequency detector 63 detects a driving signal from the Tk filter 41 to determine its gain and phase based on the frequency of a sine wave from the sine wave generator 64, while simultaneously transmitting zero to the vector calculator 73 as gain and phase information. Alternatively, if the control signal from the eccentricity compensation controling signal 72 is at a low level, the frequency detector 63 transmits determined gain and phase information to the vector calculator 73.

The gain and phase information from the frequency detector 63 has an initial value of zero. If the control signal from the eccentricity compensation controling signal 72 is at the high level, the frequency detector 69 detects the driving signal from the Tk filter 41 to determine its gain and phase based on the frequency of the sine wave from the sine wave generator 64, while simultaneously transmitting zero to the vector calculator 73 as gain and phase information. Alternatively, if the control signal from the eccentricity compensation controling signal 72 is at the low level, the frequency detector 69 transmits determined gain and phase information to the vector calculator 73.

The gain and phase information from the frequency detector 69 has an initial value of zero. In response to the control signal from the eccentricity compensation controling signal 72, the vector calculator 73 transmits the gain information and phase information calculated from the gain information and phase information from the frequency detector 63 and the gain information and phase information from the frequency detector 69, to the gain compensating devicer 66 and the phase compensating devicer 65, respectively. The phase compensating devicer 65 varies the phase of the sine wave from the sine wave generator based on the phase information from the vector calculator 73.

The gain compensating devicer 66 varies the gain of the sine wave from the phase compensating devicer 65 based on the gain information from the vector calculator 73. The adder 42 adds a signal from the gain compensating devicer 66 and the signal from the Tk filter 41 together and transmits the resulting signal to the tracking actuator 17.

The operation of the sine wave generator 64 will be explained with reference to FIG. 2. FIG. 2a shows a signal from the rotation phase detect device 51, and FIG. 2b shows a signal from the sine wave generator 64. The sine wave generator 64 generates and outputs a sine wave having the same frequency as a signal from the rotation phase detect device 51 as well as predetermined gain and phase. The generated sine waveform has a frequency that is the same as the rotation frequency of the optical disc and acts as a base for generation of an eccentricity correction driving signal.

Since a main component of eccentricity is the rotation frequency of the optical disc, a driving signal from the Tk filter 41 also has the same frequency component and a frequency detector 63 detects the magnitude and direction of the driving signal using the sine wave transmitted from the sine wave generator 64 and having the same frequency. FIG. 3 shows the frequency detector 63 in detail. A waveform input in FIG. 3 indicates the Tk filter 41, a command input therein indicates the eccentricity compensation controling signal 72, and a gain output and a phase output therein both indicate the vector calculator 73.

The signal from the sine wave generator 64 is transmitted to the multiplier 81 and the phase delaying device 80. The phase delaying device 80 delays the phase of the signal from the sine wave generator 64 by $\pi/2$ and then transmits the delayed signal to the multiplier 82. The signal from the Tk filter 41 is transmitted to the multipliers 81 and 82. The control signal from the eccentricity compensation controling signal 62 is transmitted to the integrators 83 and 84. The multiplier 81 multiplies the signal from the sine wave generator 64 and the signal from the Tk filter 41 together and transmits the result to the integrator 83. The multiplier 82 multiplies the signal from the phase delaying device 80 and the signal from the Tk filter 41 together and transmits the result to the integrator 84.

When the control signal from the eccentricity compensation controling signal 62 is at the high level, the integrator 83 integrates signals from the multiplier 81 and transmits the result to the coordinate converter 85. When the control signal from the eccentricity compensation controling signal 62 is at the high level, the integrator 84 integrates signals from the multiplier 82 and transmits the result to the coordinate converter 85.

When the control signal from the eccentricity compensation controling signal 62 is at the low level, the integrators 83 and 84 hold and then transmit the integrated values to the coordinate converter 85. On detecting a rising edge in the control signal from the eccentricity compensation controling signal 62, the integrators 83 and 84 clear the integrated values to zero. The coordinate converter 85 considers the integrated values from the integrators 83 and 84 to be orthogonal coordinate expressions, converts them into polar coordinates, and then transmits gain and phase information to the vector calculator 73. The frequency detector 69 is configured similarly to the frequency detector 63.

Figure 8:
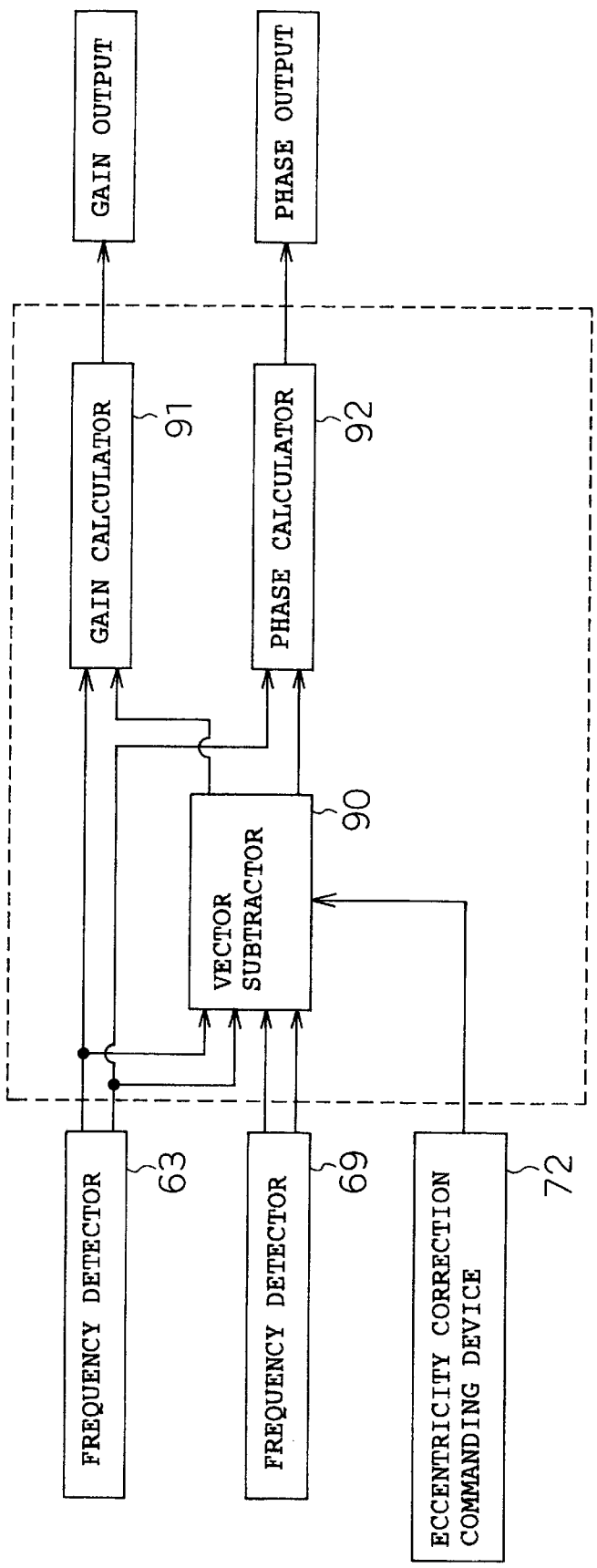
FIG. 8 is a detailed block diagram of a vector calculator according to Embodiment 5 of the present invention.

FIG. 8 shows the vector calculator 73 in detail. A gain output in FIG. 8 indicates the gain compensating devicer 66, and a phase output therein indicates the phase compensating devicer 65. The frequency detector 63 transmits gain information to the vector subtractor 90 and a gain calculator 91. The frequency detector 63 transmits phase information to the vector subtractor 90 and a phase calculator 92. The frequency detector 69 transmits gain and phase information to the vector subtractor 90. The eccentricity compensation controling signal 72 transmits the control signal to the vector subtractor 90.

The vector subtractor 90 continues transmitting the gain and phase information from the frequency detector 63 to the gain calculator 91 and the phase calculator 92, respectively, until it detects a falling edge in the control signal from the eccentricity compensation controling signal 72. Once the vector subtractor 90 has detected a falling edge in the control signal from the eccentricity compensation controling signal 72, it subtracts a vector comprising the gain and phase information from the frequency detector 69 from a vector comprising the gain and phase information from the frequency detector 63 and transmits gain and phase information on the resulting vector to the gain calculator 91 and the phase calculator 92, respectively.

The gain calculator 91 divides the square of the gain information from the frequency detector 63 by the gain information from the vector calculator 90 and then transmits the result to the gain compensating devicer 66. The phase calculator 92 subtracts the phase information from the vector subtractor 90 from a value obtained by doubling the phase information from the frequency detector 63, and transmits the result to the phase compensating devicer 65. Since the frequency detector 63 and the vector calculator 90 outputs the same gain and phase information until a falling edge from the eccentricity compensation controling signal 72 is detected, the gain information from the gain calculator 91 is the same as that from the frequency detector 63, whereas the phase information from the phase calculator 92 is the same as the phase information therefrom.

To accurately correct eccentricity, the present embodiment executes the eccentricity correction learning in two stages.

To execute a first-stage eccentricity correction learning, the eccentricity compensation controling signal 72 changes the control signal to the frequency detector 63 and the vector calculator 73, from a perpendicularly low level to a high level and maintains this level for a period corresponding to one rotation of the optical disc. The integrators 83 and 84 clear the integrated values to zero when the eccentricity correction learning starts and integrate the results of multiplications for one rotation of the optical disc, that is, one period of eccentricity. A method for using two sine waves having predetermined frequencies as well as a phase difference of $\pi/2$ to multiply and integrate them by and with a target waveform is called "orthogonal heterodyne detection." This provides a real component and an imaginary component of the gain for a predetermined frequency component of the target waveform.

When the gain and phase of the signal from the sine wave generator 64 are used as references, the integrated value from the integrator 83, which is the result of the calculation using the signal from the sine wave generator 64, indicates a real component of the magnitude of the rotation frequency component of the optical disc in the signal from the Tk filter 41, while the integrated value from the integrator 84, which is the result of the calculation using the signal from the phase delaying device 80, indicates an imaginary component of the magnitude of the rotation frequency component of the optical disc in the signal from the Tk filter 41. By using the coordinate converter 85 to convert the real and imaginary components of the magnitude of the rotation frequency component of the optical disc in the signal from the Tk filter 41, the magnitude and phase of the rotation frequency component of the optical disc in the signal from the Tk filter 41 are obtained.

Since the gain and phase information from the frequency detector 69 equals zero, the gain information from the vector calculator 73 is the same as that from the frequency detector 63, and the phase information therefrom is the same as that from the frequency detector 63.

The gain information from the vector calculator 73 is directly used for the first-stage eccentricity correction driving. The phase information from the vector calculator 73 is also directly used therefor.

The signal from the sine wave generator 64 has its phase corrected by the phase compensating devicer 65 depending on the determined phase information on the first-stage eccentricity correction driving, and has its gain corrected by the gain compensating devicer 66 depending on the determined gain information on the first-stage eccentricity correction driving. Sinusoidal first-stage eccentricity correction driving dependent on the magnitude and phase of eccentricity is thus obtained.

With the determined first-stage eccentricity correction driving applied, to execute a second-stage eccentricity correction learning, the eccentricity compensation controling signal 72 changes the control signal to the frequency detector 69 from a perpendicularly low level to a high level and maintains this level for a period corresponding to one rotation of the optical disc. Using as references the gain and phase of the signal from the sine wave generator 64, the frequency detector 69 determines the magnitude and phase of the rotation frequency component of the optical disc in the driving signal from the Tk filter 41. Once the magnitude and phase of residual eccentricity have been determined with the first-stage eccentricity correction driving applied, the control signal from the eccentricity compensation controling signal 72 to the vector calculator 73 falls, so that the vector calculator 73 subsequently executes corrections based on vector calculations.

The gain and phase information measured by the frequency detector 69 during the second-stage eccentricity correction learning indicates eccentricity remaining after the first-stage eccentricity correction driving has been applied. Accordingly, if the first-stage eccentricity correction learning completely corrects the eccentricity, the gain information for the second-stage eccentricity correction learning equals zero. The gain and phase information that is the result for the vector subtractor 90 indicates a change in the eccentricity caused by the first-stage eccentricity correction driving.

Since a correction target is the gain and phase information from the frequency detector 63 determined during the first stage, the gain calculator 91 and the phase calculator 92 calculates the amount of corrections for the gain and phase information, respectively, so that the result for the vector subtractor 90 equals the target.

The gain calculator 91 can execute a calculation for correcting a gain error in the gain information from the vector subtractor 90 with respect to the gain information from the frequency detector 63. The phase calculator 92 can execute a calculation for correcting a phase error in the phase information from the vector subtractor 90 with respect to the phase information from the frequency detector 63. The corrected gain and phase information from the vector calculator 73 is used to generate second-stage eccentricity correction driving.

The signal from the sine wave generator 64 has its phase corrected by the phase compensating devicer 65 depending on the determined phase information on the second-stage eccentricity correction driving, and has its gain corrected by the gain compensating devicer 66 depending on the determined gain information on the second-stage eccentricity correction driving. A deviation effected by the second-stage eccentricity correction driving can thus be made closer to the deviation indicated by the gain and phase information from the frequency detector 63.

(Embodiment 6)

Figure 9:
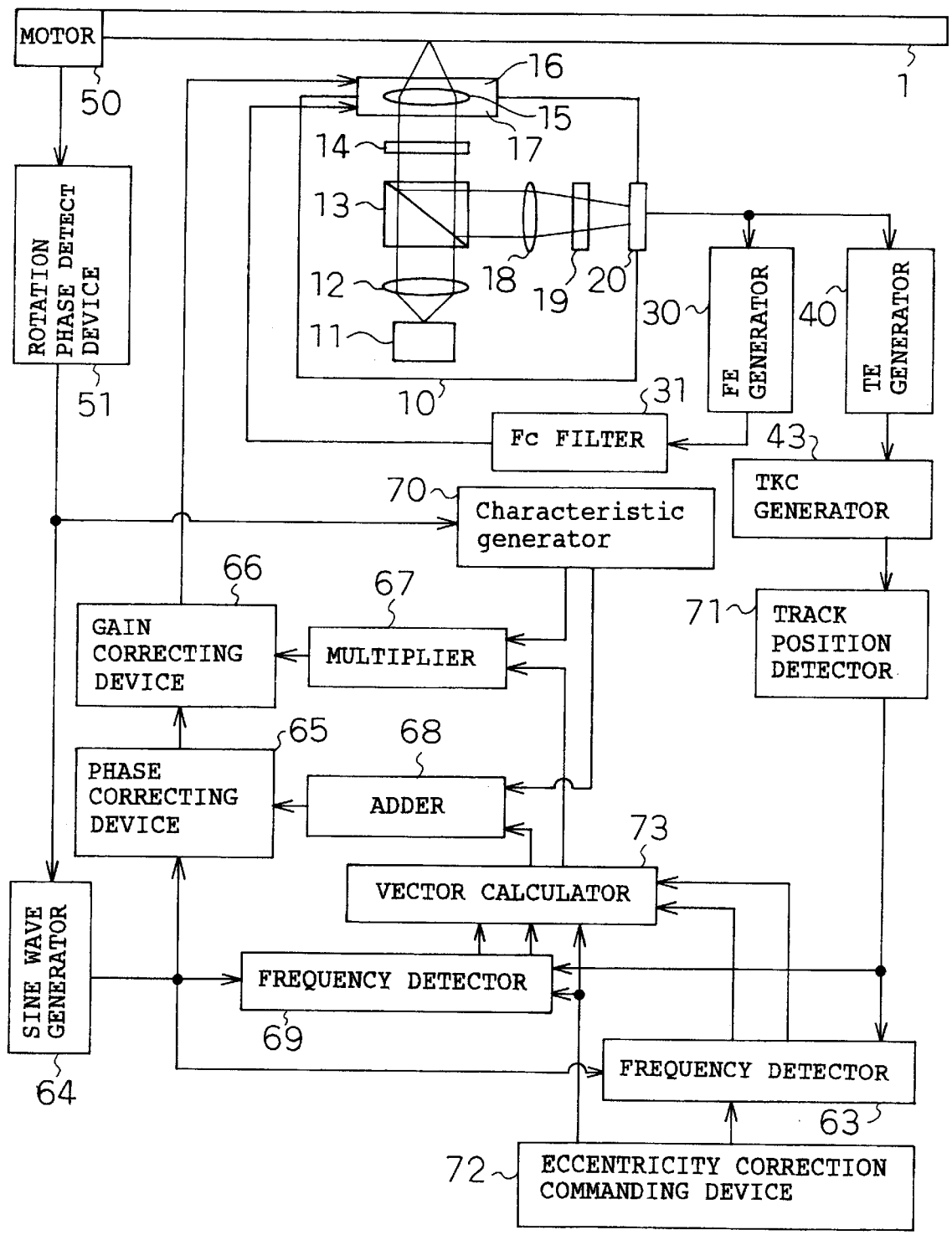
FIG. 9 is a block diagram showing the configuration of Embodiment 6 of the present invention.

FIG. 9 shows a block diagram of an optical disc apparatus according to Embodiment 6. Those components in FIG. 9 that are the same as in FIG. 16 have the same reference numerals and description thereof is thus omitted. Rotation phase information from the rotation phase detect device 51 is transmitted to the sine wave generator 64 and a characteristic generator 70. The sine wave generator 64 transmits a sine wave having a frequency that is the same as the rotation frequency, to the tracking actuator 17 via the phase compensating devicer 65 and the gain compensating devicer 66 based on the rotation phase information from the rotation phase detect device 51, and transmits the same signal to the frequency detectors 63 and 69. The eccentricity compensation controling signal 72 transmits separate control signals to the frequency detectors 63 and 69.

The eccentricity compensation controling signal 72 transmits the signal sent to the frequency detector 69, to the vector calculator 73 at the same time.

In a tracking non-control state, a tracking error signal from the TE generator 40 has one period of waveform for one track. The tracking error signal is binarized by the track cross generator 43 and then transmitted to the track position detector 71. The track position detector 71 counts rising edges in the track cross signal from the track cross generator 43 and multiplies the count value by the interval between tracks of the optical disc to generate a track position, which is then transmitted to the frequency detectors 63 and 69.

If the control signal from the eccentricity compensation controling signal 72 is at a high level, the frequency detector 63 detects a track position signal from the track position detector 71 to determine its gain and phase based on the frequency of a sine wave from the sine wave generator 64, while simultaneously transmitting zero to the vector calculator 73 as gain and phase information. Alternatively, if the control signal from the eccentricity compensation controling signal 72 is at a low level, the frequency detector 63 transmits the determined gain and phase information to the vector calculator 73.

The gain and phase information from the frequency detector 63 has an initial value of zero. If the control signal from the eccentricity compensation controling signal 72 is at the high level, the frequency detector 69 detects the track position signal from the track position detector 71 to determine its gain and phase based on the frequency of the sine wave from the sine wave generator 64, while simultaneously transmitting zero to the vector calculator 73 as gain and phase information. Alternatively, if the control signal from the eccentricity compensation controling signal 72 is at the low level, the frequency detector 69 transmits determined gain and phase information to the vector calculator 73.

The gain and phase information from the frequency detector 69 has an initial value of zero. In response to the control signal from the eccentricity compensation controling signal 72, the vector calculator 73 transmits the gain information and phase information calculated from the gain information and phase information from the frequency detector 63 and the gain information and phase information from the frequency detector 69, to the multiplier 67 and the adder 68, respectively.

The characteristic generator 70 has gain and phase information on an inverse transfer characteristic of the tracking actuator 17 and detects a rotation frequency from the rotation phase information from the rotation phase detect device 51 to transmit gain and phase information dependent on the determined frequency to the multiplier 67 and the adder 68, respectively. Since the inverse transfer characteristic of the tracking actuator 17 indicates what driving signal is obtained for a tracking position signal, gain and phase information is determined to correct the measured tracking position signal.

The multiplier 67 multiplies the gain information from the vector calculator 73 and characteristic generator 70 together and then transmits the result to the gain compensating devicer 66. The adder 68 adds the phase information from the vector calculator 73 and characteristic generator 70 together and transmits the result to the phase compensating devicer 65. The phase compensating devicer 65 varies the phase of the sine wave from the sine wave generator 64 based on the phase information from the adder 68. The gain compensating devicer 66 varies the gain of the sine wave from the phase compensating devicer 65 based on the gain information from the multiplier 67.

The operation of the sine wave generator 64 will be explained with reference to FIG. 2. FIG. 2a shows a signal from the rotation phase detect device 51, and FIG. 2b shows a signal from the sine wave generator 64. The sine wave generator 64 generates and outputs a sine wave having the same frequency as a signal from the rotation phase detect device 51 as well as predetermined gain and phase. The generated sine waveform has a frequency that is the same as the rotation frequency of the optical disc and acts as a base for generation of an eccentricity correction driving signal.

In the tracking non-control state, the tracking error signal from the TE generator 40 has one period of waveform for one track. One rising edge in a signal binarized by the track cross generator 43 is present for the one track. The track position detector 71 counts rising edges in the signal from the track cross generator 43 and multiplies the count value by the interval between tracks of the optical disc to generate the track position.

Since a main component of eccentricity is the rotation frequency of the optical disc, the track position signal from the track position detector 71 also has the same frequency component and the frequency detector 63 detects the magnitude and direction of the track position signal using the sine wave transmitted from the sine wave generator 64 and having the same frequency. FIG. 3 shows the frequency detector 63 in detail. A waveform input in FIG. 3 indicates the track position detector 71, a command input therein indicates an eccentricity compensation controling signal 72, and a gain output and a phase output therein both indicates the vector calculator 73. The signal from the sine wave generator 64 is transmitted to the adder 81 and the phase delaying device 80. The phase delaying device 80 delays the phase of the signal from the sine wave generator 64 by $\pi/2$ and then transmits the delayed signal to the multiplier 82.

The track position signal from the track position detector 71 is transmitted to the multipliers 81 and 82. The control signal from the eccentricity compensation controling signal 62 is transmitted to the integrators 83 and 84. The multiplier 81 multiplies the signal from the sine wave generator 64 and the track position signal from the track position detector 71 together and transmits the result to the integrator 83. The multiplier 82 multiplies the signal from the phase delaying device 80 and the track. position signal from the track position detector 71 together and transmits the result to the integrator 84. When the control signal from the eccentricity compensation controling signal 62 is at the high level, the integrator 83 integrates signals from the multiplier 81 and transmits the result to the coordinate converter 85.

When the control signal from the eccentricity compensation controling signal 62 is at the high level, the integrator 84 integrates signals from the multiplier 82 and transmits the result to the coordinate converter 85. When the control signal from the eccentricity compensation controling signal 62 is at the low level, the integrators 83 and 84 hold and then transmit the integrated values to the coordinate converter 85. On detecting a rising edge in the control signal from the eccentricity compensation controling signal 62, the integrators 83 and 84 clear the integrated values to zero. The coordinate converter 85 considers the integrated values from the integrators 83 and 84 to be orthogonal coordinate expressions, converts them into polar coordinates, and then transmits gain and phase information to the vector calculator 73. The frequency detector 69 is configured similarly to the frequency detector 63.

FIG. 8 shows the vector calculator 73 in detail. A gain output in FIG. 8 indicates the multiplier 67, and a phase output therein indicates the adder 68. The frequency detector 63 transmits gain information to the vector subtractor 90 and the gain calculator 91. The frequency detector 63 transmits phase information to the vector subtractor 90 and the phase calculator 92. The frequency detector 69 transmits gain and phase information to the vector subtractor 90. The eccentricity compensation controling signal 72 transmits the control signal to the vector subtractor 90.

The vector subtractor 90 continues transmitting the gain and phase information from the frequency detector 63 to the gain calculator 91 and the phase calculator 92, respectively, until it detects a falling edge in the control signal from the eccentricity compensation controling signal 72. Once the vector subtractor 90 has detected a falling edge in the control signal from the eccentricity compensation controling signal 72, it subtracts a vector comprising the gain and phase information from the frequency detector 69 from a vector comprising the gain and phase information from the frequency detector 63 and transmits gain and phase information on the resulting vector to the gain calculator 91 and the phase calculator 92, respectively.

The gain calculator 91 divides the square of the gain information from the frequency detector 63 by the gain information from the vector calculator 90 and then transmits the result to the multiplier 67. The phase calculator 92 subtracts the phase information from the vector subtractor 90 from a value obtained by doubling the phase information from the frequency detector 63, and transmits the result to the adder 68. Since the frequency detector 63 and the vector calculator 90 outputs the same gain and phase information until a falling edge from the eccentricity compensation controling signal 72 is detected, the gain information from the gain calculator 91 is the same as that from the frequency detector 63, whereas the phase information from the phase calculator 92 is the same as the phase information therefrom.

To accurately correct eccentricity, the present embodiment executes the eccentricity correction learning in two stages.

To execute a first-stage eccentricity correction learning, the eccentricity compensation controling signal 72 changes the control signal to the frequency detector 63 and vector calculator 73 from a perpendicularly low level to a high level and maintains this level for a period corresponding to one rotation of the optical disc. The integrators 83 and 84 clear the integrated values to zero when the eccentricity correction learning starts and integrate the results of multiplications for one rotation of the optical disc, that is, one period of eccentricity. A method for using two sine waves having predetermined frequencies as well as a phase difference of $\pi/2$ to multiply and integrate them by and with a target waveform is called "orthogonal heterodyne detection." This provides a real component and an imaginary component of the gain for a predetermined frequency component of the target waveform.

When the gain and phase of the signal from the sine wave generator 64 are used as references, the integrated value from the integrator 83, which is the result of the calculation using the signal from the sine wave generator 64, indicates a real component of the magnitude of the rotation frequency component of the optical disc in the track position signal from the track position detector 71, while the integrated value from the integrator 84, which is the result of the calculation using the signal from the phase delaying device 80, indicates an imaginary component of the magnitude of the rotation frequency component of the optical disc in the track position signal from the track position detector 71. By using the coordinate converter 85 to convert the real and imaginary components of the magnitude of the rotation frequency component of the optical disc in the track position signal from the track position detector 71, the magnitude and phase of the rotation frequency component of the optical disc in the track position signal from the track position detector 71 are obtained.

Since the gain and phase information from the frequency detector 69 equals zero, the gain information from the vector calculator 73 is the same as that from the frequency detector 63, whereas the phase information therefrom is the same as that from the frequency detector 63.

The characteristic generator 70 generates gain and phase information on the inverse transfer characteristic of the tracking actuator 17 for the rotation frequency of the optical disc.

The multiplier 67 multiplies the gain information from the vector calculator 73 by the gain information from the characteristic generator 70 to obtain gain information for the first-stage eccentricity correction driving. The adder 68 adds the phase information from the vector calculator 73 and the phase information from the characteristic generator 70 together to obtain phase information for the first-stage eccentricity correction driving. The signal from the sine wave generator 64 has its phase corrected by the phase compensating devicer 65 depending on the determined phase information on the first-stage eccentricity correction driving, and has its gain corrected by the gain compensating devicer 66 depending on the determined gain information on the first-stage eccentricity correction driving. Sinusoidal first-stage eccentricity correction driving dependent on the magnitude and phase of eccentricity is thus obtained.

With the determined first-stage eccentricity correction driving applied, to execute a second-stage eccentricity correction learning, the eccentricity compensation controling signal 72 changes the control signal to the frequency detector 69 from a perpendicularly low level to a high level and maintains this level for a period corresponding to one rotation of the optical disc. Using as references the gain and phase of the signal from the sine wave generator 64, the frequency detector 69 determines the magnitude and phase of the rotation frequency component of the optical disc for the residual eccentricity in the track position signal from the track position detector 71.

Once the magnitude and phase of residual eccentricity have been determined with the first-stage eccentricity correction driving applied, the control signal from the eccentricity compensation controling signal 72 to the vector calculator 73 falls, so that the vector calculator 73 subsequently executes corrections based on vector calculations.

The gain and phase information measured by the frequency detector 69 during the second-stage eccentricity correction learning indicates eccentricity remaining after the first-stage eccentricity correction driving has been applied. Accordingly, if the first-stage eccentricity correction learning completely corrects the eccentricity, the gain information for the second-stage eccentricity correction learning equals zero. The gain and phase information that is the result for the vector subtractor 90 indicates a change in the eccentricity caused by the first-stage eccentricity correction driving. Since a correction target is the gain and phase information from the frequency detector 63 determined during the first stage, the gain calculator 91 and the phase calculator 92 calculates the amount of corrections for the gain and phase information, respectively, so that the result for the vector subtractor 90 equals the target.

The gain calculator 91 can execute a calculation for correcting a gain error in the gain information from the vector subtractor 90 with respect to the gain information from the frequency detector 63. The phase calculator 92 can execute a calculation for correcting a phase error in the phase information from the vector subtractor 90 with respect to the phase information from the frequency detector 63. The corrected gain and phase information from the vector calculator 73 is used to generate second-stage eccentricity correction driving.

The signal from the sine wave generator 64 has its phase corrected by the phase compensating devicer 65 depending on the determined phase information on the second-stage eccentricity correction driving, and has its gain corrected by the gain compensating devicer 66 depending on the determined gain information on the second-stage eccentricity correction driving. A deviation effected by the second-stage eccentricity correction driving can thus be made closer to the deviation indicated by the gain and phase information from the frequency detector 63.

(Embodiment 7)

Figure 10:
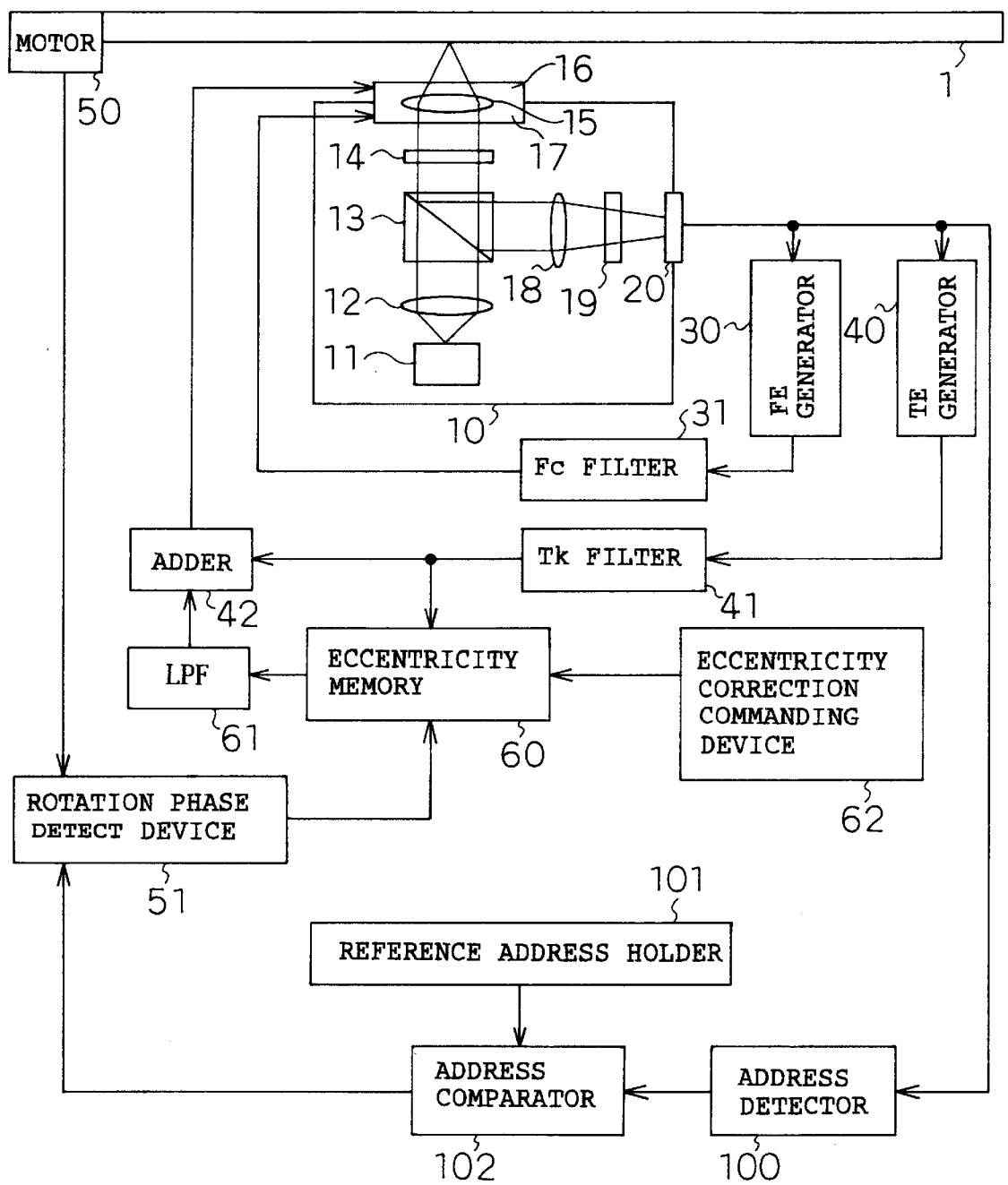
FIG. 10 is a block diagram showing the configuration of Embodiment 7 of the present invention.
Figure 11:
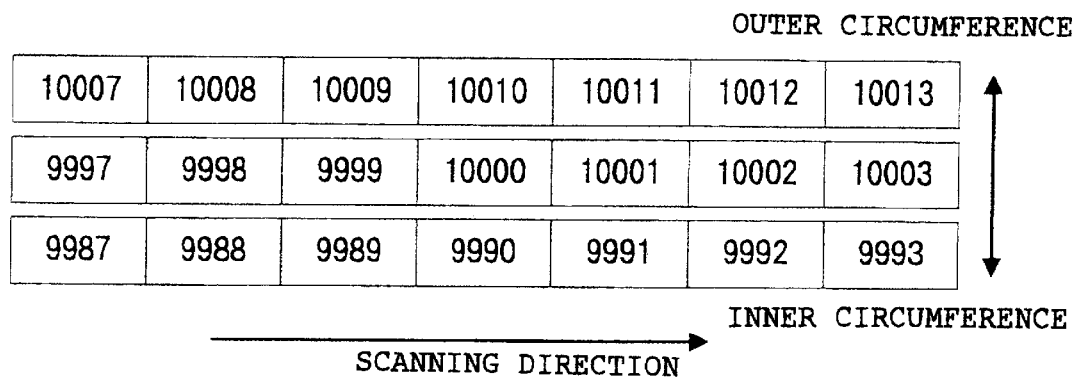
FIG. 11 is a diagram showing the relationship between address information (FIG. 11a) from an address detector according to Embodiment 7 of the present invention and a pulse signal (FIG. 11b) from an address comparator.
Figure 11:

FIG. 10 shows a block diagram of an optical disc apparatus according to Embodiment 7. Those components in FIG. 10 that are the same as in FIG. 16 have the same reference numerals and description thereof is thus omitted. A signal from the optical detector 20 is transmitted to an address detector 100. The address detector 100 detects the current address scanned by an optical beam and transmits it to an address comparator 102. The reference address holder 101 stores all addresses of a referential rotation phase from its inner to outer circumference and transmits this address information to the address comparator 102. If the address information from the address detector 100 matches any of the addresses in the reference address holder 101, the address comparator 102 transmits a pulse signal of a predetermined width to the rotation phase detect device 51. On detecting a rising edge in a signal from the address comparator 102, the rotation phase detect device 51 changes the reference for rotation phase information transmitted to the memory 60 to the current rotation phase.

While the optical disc 1 is being reproduced, the address detector 100 can always obtain the current address information. One rotation involves 10 addresses, and positions corresponding to 10n+1-th (n is a natural number) addresses are used as targets for the rotation phase reference. The reference address holder 101 holds information on the addresses corresponding to 10n+1 (n is a natural number). FIG. 11a shows the arrangement of addresses on the optical disc 1. The optical beam sequentially scans the addresses rightward. When the beam reaches an address corresponding to 10n+1 (n is a natural number), the address comparator 102 generates a pulse signal such as that shown in FIG. 11b. Since the rotation phase detect device 51 changes the reference for the rotation phase information in accordance with the pulse signal from the address comparator 102, which is generated during each rotation, the same rotation phase position is always used as the reference. Even if the state for the eccentricity correcting operation shifts to a sleep state to deviate the reference for the rotation phase information output from the rotation phase detect device 51, the reference is corrected at the time of reactivation as described above, thereby hindering the deviation of a phase for the eccentricity correcting operation.

(Embodiment 8)

Figure 12:
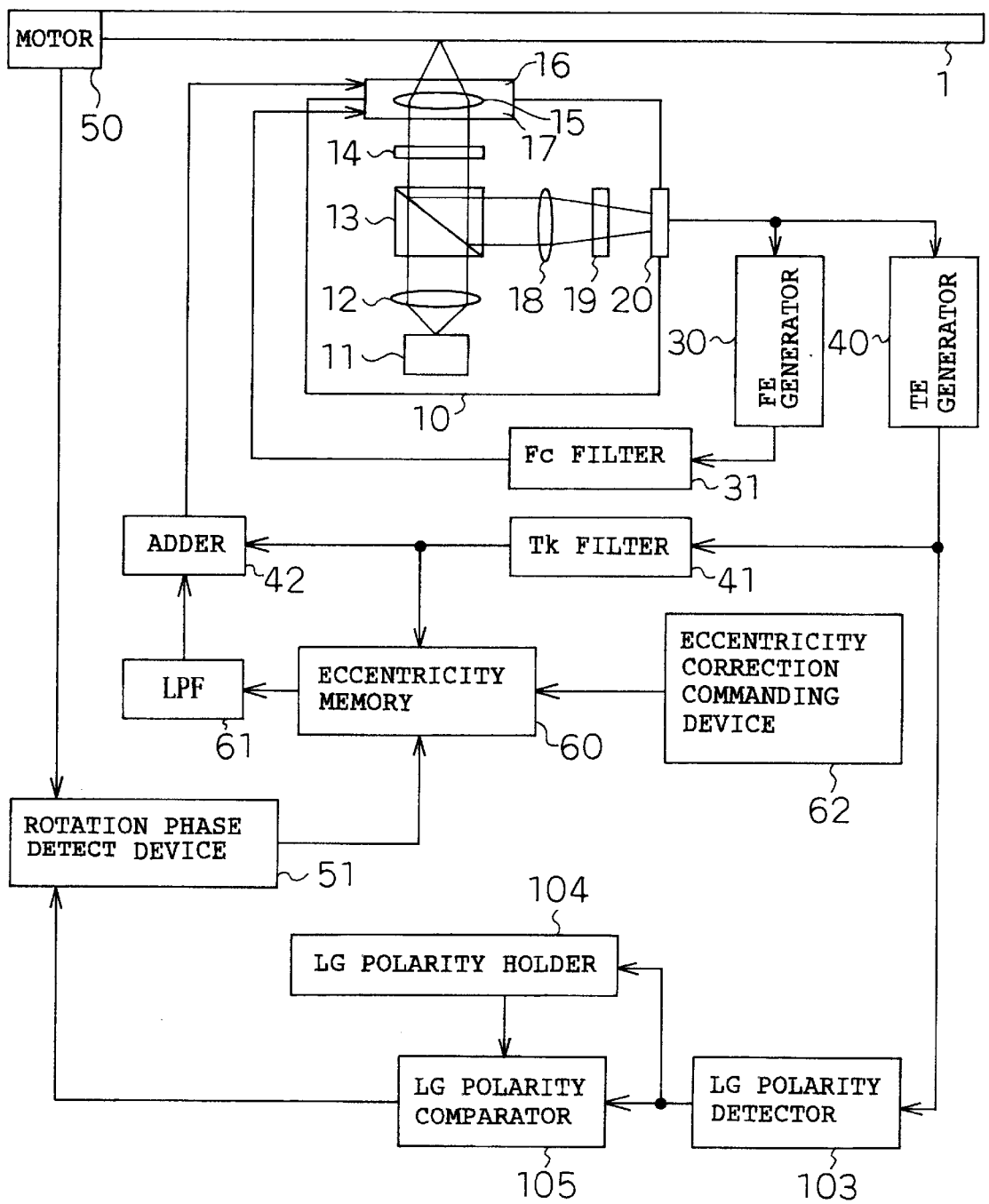
FIG. 12 is a block diagram showing the configuration of Embodiment 8 of the present invention.

FIG. 12 shows a block diagram of an optical disc apparatus according to Embodiment 8. Those components in FIG. 12 that are the same as in FIG. 16 have the same reference numerals and description thereof is thus omitted. A signal from the TE generator is transmitted to an LG polarity detector 103. The LG polarity detector 103 detects an address arrangement pattern whenever an address appears and then transmits it to an LG polarity holder 104 and an LG polarity comparator 105. The LG polarity holder 104 holds the address arrangement pattern from the LG polarity detector 103 and transmits an address arrangement pattern including addresses up to the preceding one, to the LG polarity comparator 105.

The LG polarity comparator 105 compares the address arrangement pattern from the LG polarity detector 103 with the address arrangement pattern from the LG polarity holder 104, and transmits a pulse signal of a predetermined width to the rotation phase detect device 51 if the two address patterns differ. On detecting a rising edge in a signal from the address comparator 102, the rotation phase detect device 51 changes the reference for the rotation phase information transmitted to the memory 60, to the current rotation phase.

The tracks in the optical disc 1 each comprise a guide groove including a recess (hereafter referred to as a "land portion") and a projection (hereafter referred to as a "groove portion"). The land portion and the groove portion are existed along the track during each rotation, and a switching point therefor is present on the same rotation phase. Address information for the land portion indicates that the addresses are staggered in such a manner that the former half thereof is shifted toward the outer circumference while the latter half is shifted toward the inner circumference. Address information for the groove portion indicates that the addresses are staggered in such a manner that the former half thereof is shifted toward the inner circumference while the latter half is shifted toward the outer circumference. This shift pattern is the address arrangement pattern.

Detecting the address arrangement pattern enables the user to determine whether a particular position corresponds to the land or groove portion, thereby enabling detection of a switching point from the land portion to the groove portion and a switching point from the groove portion to the land portion. FIG. 13a shows whether a position scanned by an optical beam corresponds to the land or groove portion. Additionally, FIG. 13b shows a tracking error signal from the TE generator 40. In the land portion, the addresses are alternately shifted toward the outer circumference and then toward the inner circumference in the track direction, so that the tracking error signal is generated as a disturbance shifting upward and then downward as shown in the left of FIG. 13b. In the groove portion, the addresses are alternately shifted toward the inner circumference and then toward the outer circumference in the track direction, so that the tracking error signal is generated as a disturbance shifting downward and then upward as shown in the right of FIG. 13b.

Figure 13:
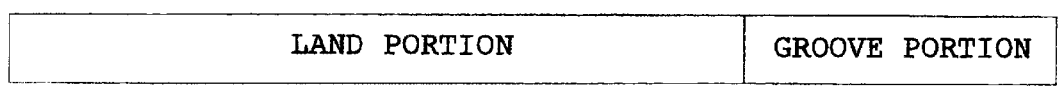
FIG. 13 is a diagram showing the relationship between the polarity of a guide groove irradiated with an optical beam and a tracking error signal (FIG. 13b) from a TE generator and a pulse signal (FIG. 13c) from an LG polarity comparator according to Embodiment 8 of the present invention.
Figure 13:
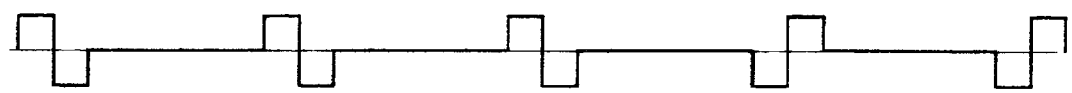
Figure 13:

The LG polarity detector 103 detects the address arrangement pattern from the pattern of the disturbance in the tracking error signal. In FIG. 13, when the land portion switches to the groove portion, the address arrangement pattern also changes, which can be detected from the tracking error signal. Since the current address arrangement pattern differs from an address arrangement pattern including addresses up to the preceding one, the LG polarity comparator 105 transmits a pulse signal such as that shown in FIG. 13c, to the rotation phase detect device 51. Since the rotation phase detect device 51 changes the reference for the rotation phase information in accordance with the pulse signal from the LG polarity comparator 105, which is generated at the switching point from the land portion to the groove portion or from the groove portion to the land portion, the same rotation phase position is always used as the reference.

Even if the state for the eccentricity correcting operation shifts to the sleep state to deviate the reference for the rotation phase information output from the rotation phase detect device 51, the reference is corrected at the time of reactivation as described above, thereby hindering the deviation of the phase for the eccentricity correcting operation.
(Embodiment 9)

Figure 14:
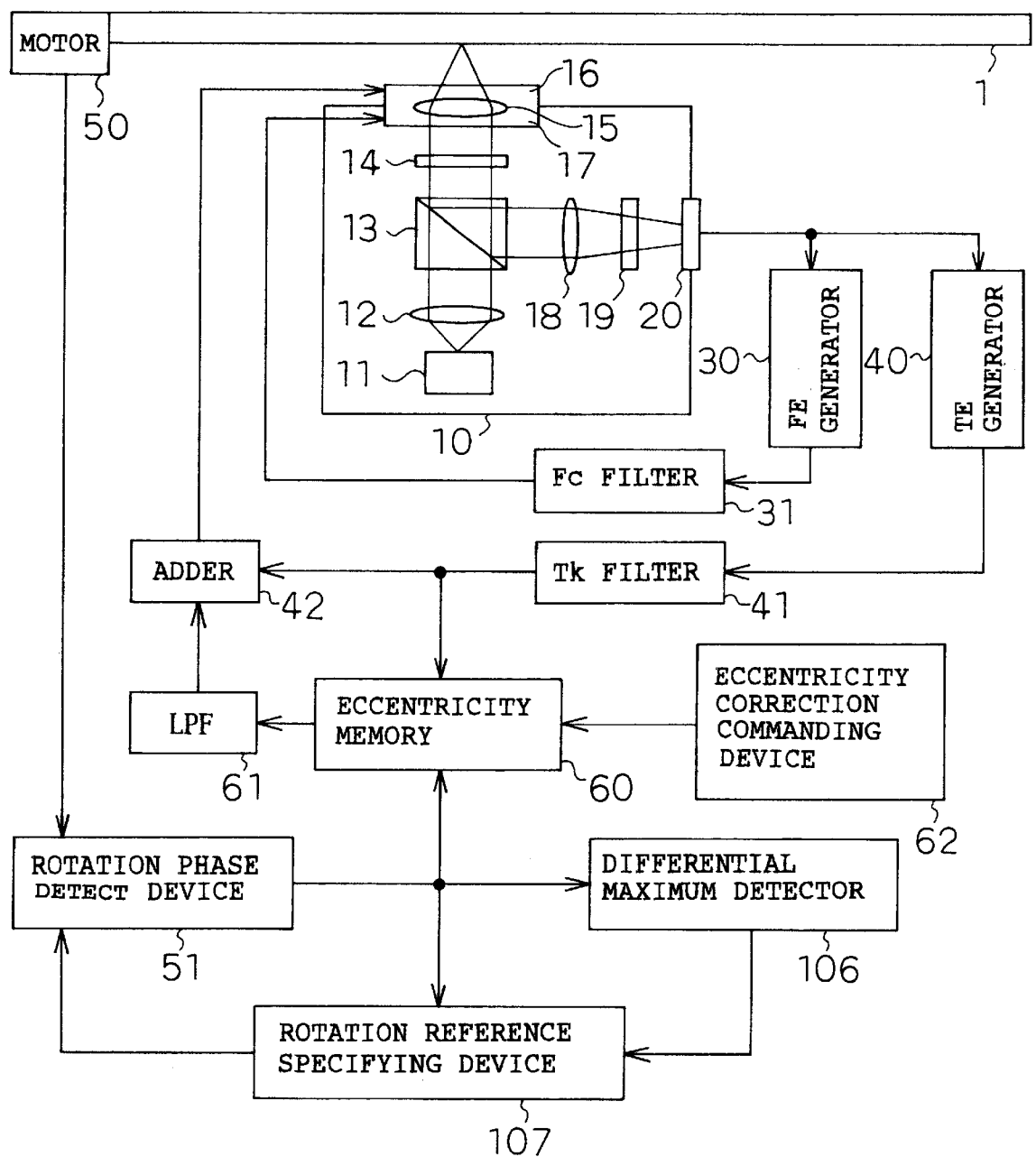
FIG. 14 is a block diagram showing the configuration of Embodiment 9 of the present invention.

FIG. 14 shows a block diagram of an optical disc apparatus according to Embodiment 9. Those components in FIG. 14 that are the same as in FIG. 16 have the same reference numerals and description thereof is thus omitted. Rotation phase information from the rotation phase detect device 51 is transmitted to a differential maximum detector 106 and a rotation reference specifying device 107. The differential maximum detector 106 detects a rotation phase position where the differential of the rotation phase information from the rotation phase detect device 51 is maximum, and transmits this position to the rotation reference specifying device 107.

When the rotation phase information from the rotation phase detect device 51 matches the rotation phase position from the differential maximum detector 106, the rotation reference specifying device 107 transmits a pulse of a predetermined width to the rotation phase detect device 51. On detecting a rising edge in a signal from the address comparator 102, the rotation phase detect device 51 changes the reference for the rotation phase information transmitted to the memory 60, to the current rotation phase.

Figure 15A:
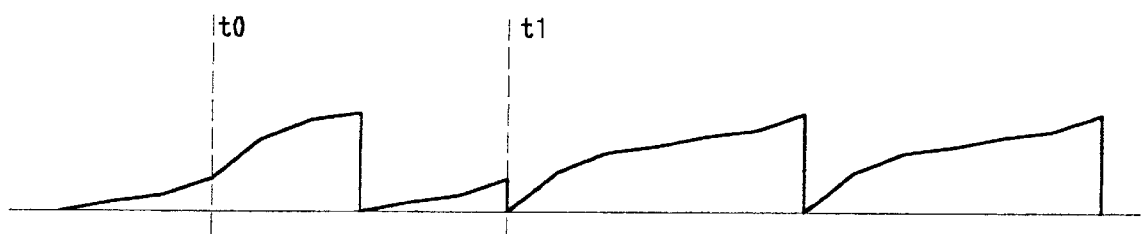
FIG. 15 is a diagram showing the relationship between rotation phase information (FIG. 15a) from a rotation phase detect device according to Embodiment 9 of the present invention and a pulse signal (FIG. 15b) from a rotation reference specifying device.
Figure 15B:
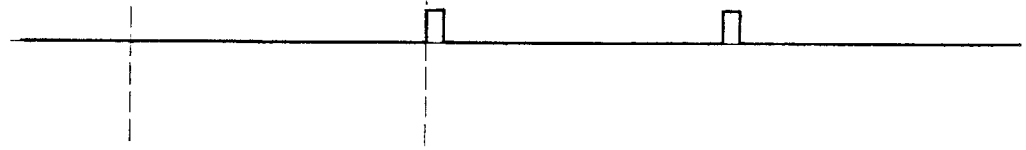

FIG. 15a shows rotation phase information from the rotation phase detect device 51, and FIG. 15b shows a signal from the rotation reference specifying device 107. The rotation phase detect device 51 counts rising edges in an encoder pulse from the motor 50. Even if the motor 50 rotates at a constant rotation number, since an encoder output interval varies, the inclination of an increase in rotation phase information is inconstant as shown in FIG. 15a.

The differential maximum detector 106 measures the inclination of an increase in rotation phase information by calculating the differential of the rotation phase information from the rotation phase detect device 51. The differential maximum detector 106 also detects a maximum value during a time after the rotation phase information from the rotation phase detect device 51 is cleared and before the rotation phase information is cleared next time. The differential maximum detector 106 transmits rotation phase information for a point with a maximum differential, which is shown by t0 in FIG. 15, to the rotation reference specifying device 107.

When the rotation phase information from the differential maximum detector 106 matches that from the rotation phase detect device 51, the rotation reference specifying device 107 clears the count value for the rotation phase information and generates the subsequent rotation phase information using t1 as the reference, as shown by the point t1 in FIG. 15. After the t1, the reference for the rotation phase information matches a rotation phase with the maximum differential of the rotation phase information, and does not change.

The reference for the rotation phase information from the rotation phase detect device 51 always corresponds to a point with the maximum differential of the same rotation phase information. Even if the state for the eccentricity correcting operation shifts to the sleep state to deviate the reference for the rotation phase information output from the rotation phase detect device 51, the reference is corrected at the time of reactivation as described above, thereby hindering the deviation of the phase for the eccentricity correcting operation.

As described above, according to the present invention, even if the tracking driving comprises a waveform containing many components other than the rotation frequency of the optical disc, the direction and magnitude of eccentricity can be accurately detected in a short time to accurately correct the eccentricity.

Eccentricity remaining after the correction can be detected without addition of sensors and thus accurately corrected.

Further, if the sleep state is entered to change the reference for the rotation phase information, the reference can be changed to accurately correct the eccentricity.

What is claimed is:
1. An optical disc apparatus comprising:
converging means of applying an optical beam to a rotating disc-shaped information carrier in a manner such that the beam converges thereon;
moving means of moving said converging means to apply the optical beam to a desired track;
tracking error detecting means of detecting a positional error between the optical beam and the track on said information carrier;
tracking control means of outputting, based on a tracking error signal from said tracking error detecting means, a driving signal for providing such control that said moving means is moved to allow the optical beam applied to the information carrier to follow the track on the information carrier;
rotation frequency measuring means of measuring a rotation frequency of said information carrier;

sine wave generating means of generating a sine wave having said measured rotation frequency;

first eccentricity measuring means of measuring gain and phase of a sine wave corresponding to eccentricity of said information carrier based on the driving signal from said tracking control means and on said measured rotation frequency;

waveform shaping means of shaping the gain and phase of the sine wave generated by said sine wave generating means into said gain and phase obtained by said first eccentricity measuring means;

eccentricity correcting means of adding the sine wave shaped by said waveform shaping means and the driving signal from said tracking control means together to drive said moving means based on a signal obtained by the addition; and eccentricity correction commanding means of outputting an eccentricity correction command while said tracking control means is providing control, wherein:

when said eccentricity correction commanding means inputs the eccentricity correction command to said first eccentricity measuring means, said first eccentricity measuring means measures the gain and phase of the sine wave corresponding to the eccentricity of said information carrier, and said waveform shaping means stores the measured gain and phase and subsequently shapes, based on the stored gain and phase, the waveform of the sine wave generated by said sine wave generating means in terms of the gain and shape outputting the obtained signal.

2. An optical disc apparatus comprising:

converging means of applying an optical beam to a rotating disc-shaped information carrier in a manner such that the beam converges thereon;

moving means of moving said converging means to apply the optical beam to a desired track;

tracking error detecting means of detecting a positional error between the optical beam and the track on said information carrier;

tracking control means of outputting, based on a tracking error signal from said tracking error detecting means, a driving signal for providing such control that said moving means is moved to allow the optical beam applied to the information carrier to follow the track on the information carrier;

rotation frequency measuring means of measuring a rotation frequency of said information carrier;

sine wave generating means of generating a sine wave having said measured rotation frequency;

first eccentricity measuring means of measuring gain and phase of a sine wave corresponding to eccentricity of said information carrier based on the tracking error signal from said tracking error detecting means and on said measured rotation frequency;

waveform shaping means of shaping the gain and phase of the sine wave generated by said sine wave generating means into said gain and phase obtained by said first eccentricity measuring means;

eccentricity correcting means of adding the sine wave shaped by said waveform shaping means and the driving signal from said tracking control means together to drive said moving means based on a signal obtained by the addition; and eccentricity correction commanding means of outputting an eccentricity correction command while said tracking control means is providing no control, wherein:

when said eccentricity correction commanding means inputs the eccentricity correction command to said first eccentricity measuring means, said first eccentricity measuring means measures the gain and phase of the sine wave corresponding to the eccentricity of said information carrier, and said waveform shaping means stores the measured gain and phase and subsequently shapes, based on the stored gain and phase, the waveform of the sine wave generated by said sine wave generating means in terms of the gain and shape before.

3. The optical disc apparatus according to claim 1, comprising second eccentricity measuring means of measuring the gain and phase of the sine wave corresponding to the eccentricity of said information carrier based on the driving signal from said tracking control means and on the measured rotation frequency, wherein:

when said first eccentricity measuring means measures the gain and the phase and said eccentricity correction commanding means then inputs an eccentricity correction command to said second eccentricity measuring means, said second eccentricity measuring means measures the gain and phase of the sine wave corresponding to the eccentricity of said information carrier, and said waveform shaping means stores the gains and phases measured by said first eccentricity measuring means and said second eccentricity measuring means and subsequently shapes, based on the stored gains and phases, the waveform of the sine wave generated by said sine wave generating means in terms of the gain and shape.

4. The optical disc apparatus according to claim 1, comprising second eccentricity measuring means of measuring the gain and phase of the sine wave corresponding to the eccentricity of said information carrier based on the tracking error signal from said tracking error detecting means and on the measured rotation frequency, wherein:

when said first eccentricity measuring means measures the gain and the phase and said eccentricity correction commanding means then inputs an eccentricity correction command to said second eccentricity measuring means, said second eccentricity measuring means measures the gain and phase of the sine wave corresponding to the eccentricity of said information carrier, and said waveform shaping means stores the gains and phases measured by said first eccentricity measuring means and said second eccentricity measuring means and subsequently shapes, based on the stored gains and phases, the waveform of the sine wave generated by said sine wave generating means in terms of the gain and shape.

5. The optical disc apparatus according to claim 2, wherein said eccentricity correcting means advances the phase in a direction of the eccentricity obtained from said first eccentricity measuring means, by an amount dependent on a rotation number obtained from said rotation number measuring means.

6. The optical disc apparatus according to claim 2, wherein said eccentricity correcting means multiplies a magnitude of the eccentricity obtained from said first eccentricity measuring means by a predetermined gain dependent on the rotation number from said rotation number measuring means.

7. An optical disc apparatus comprising:

converging means of applying an optical beam to a rotating disc-shaped information carrier in a manner such that the beam converges thereon;

moving means of moving said converging means to apply the optical beam to a desired track;

tracking error detecting means of detecting a positional error between the optical beam and the track on said information carrier;

tracking control means of outputting, based on a tracking error signal from said tracking error detecting means, a driving signal for providing such control that said moving means is moved to allow the optical beam applied to the information carrier to follow the track on the information carrier;

rotation phase measuring means of measuring a rotation phase of said information carrier;

eccentricity correcting means of adding together the driving signal to said moving means which reduces the positional error between the optical beam and the track on said information carrier and the driving signal from said tracking control means to drive said moving means based on a signal obtained by the addition; and address detecting means of detecting an address of the information carrier being irradiated with the optical beam, wherein:

a phase reference for said rotation phase measuring means is determined by address information from said address detecting means.

8. The optical disc apparatus according to claim 7, comprising address arrangement storage means having an address arrangement for said information carrier, wherein:

the phase reference for said rotation phase measuring means is determined by the address information from said address detecting means and the address arrangement from said address arrangement storage means.

9. An optical disc apparatus comprising:

converging means of applying an optical beam to a disc-shaped information carrier in a manner such that the beam converges thereon, the information carrier rotating in a manner such that a land and a projection of a track groove alternately appear everyone rotation;

moving means of moving said converging means to apply the optical beam to a desired track;

tracking error detecting means of detecting a positional error between the optical beam and the track on said information carrier;

tracking control means of outputting, based on a tracking error signal from said tracking error detecting means, a driving signal for providing such control that said moving means is moved to allow the optical beam applied to the information carrier to follow the track on the information carrier;

rotation phase measuring means of measuring a rotation phase of said information carrier;

eccentricity correcting means of adding together the driving signal to said moving means which reduces the positional error between the optical beam and the track on said information carrier and the driving signal from said tracking control means to drive said moving means based on a signal obtained by the addition; and switching point detecting means of detecting a switching point from the land to the projection of the track groove on said information carrier or from the projection to the land thereof, wherein:

a phase reference for said rotation phase measuring means is determined by switching point information from said switching point detecting means.

10. The optical disc apparatus according to claim 9, comprising address detecting means of detecting an address of the information carrier being irradiated with the optical beam, wherein said switching point detecting means detects the switching point information using address information from said address detecting means.

11. The optical disc apparatus according to claim 9, wherein said switching point detecting means detects the switching point information using the tracking error signal from said tracking error detecting means.

12. An optical disc apparatus comprising:

converging means of applying an optical beam to a rotating disc-shaped information carrier in a manner such that the beam converges thereon;

moving means of moving said converging means to apply the optical beam to a desired track;

tracking error detecting means of detecting a positional error between the optical beam and the track on said information carrier;

tracking control means of outputting, based on a tracking error signal from said tracking error detecting means, a driving signal for providing such control that said moving means is moved to allow the optical beam applied to the information carrier to follow the track on the information carrier;

rotation phase measuring means of measuring a rotation phase of said information carrier;

eccentricity correcting means of adding together a driving signal to said moving means which reduces the positional error between the optical beam and the track on said information carrier and the driving signal from said tracking control means to drive said moving means based on a signal obtained by the addition; and disturbance detecting means of measuring a disturbance in rotation phase information from said rotation phase measuring means during one rotation, wherein:

a phase reference for said rotation phase measuring means is determinedby disturbance information from said disturbance detecting means.

13. The optical disc apparatus according to claim 12, wherein said disturbance detecting means determines the phase reference for said rotation phase measuring means by detecting a maximum value of a differential of the rotation phase information from said rotation phase measuring means during one rotation.

14. The optical disc apparatus according to claim 12, wherein said disturbance detecting means determines the phase reference for said rotation phase measuring means by detecting a minimum value of a differential of the rotation phase information from said rotation phase measuring means during one rotation.

* * * * *